US012772206B2

(12) United States Patent
Saha et al.

(10) Patent No.: US 12,772,206 B2
(45) Date of Patent: Oct. 20, 2026

(54) DELAYED SERVICE FOR PAGING REQUESTS

(71) Applicant: QUALCOMM Incorporated, San Diego, CA (US)

(72) Inventors: Chiranjib Saha, Lakeside, CA (US); Xiao Feng Wang, San Diego, CA (US); Alberto Rico Alvarino, San Diego, CA (US); Prasad Reddy Kadiri, San Diego, CA (US); Syed Hashim Ali Shah, San Diego, CA (US); Amer Catovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 18/531,528

(22) Filed: Dec. 6, 2023

(65) Prior Publication Data

US 2025/0193846 A1 Jun. 12, 2025

(51) Int. Cl.
*H04W 68/02* (2009.01)

(52) U.S. Cl.
CPC .................................. *H04W 68/02* (2013.01)

(58) Field of Classification Search
CPC .... H04W 68/02; H04W 76/27; H04W 68/005
See application file for complete search history.

(56) References Cited

U.S. PATENT DOCUMENTS

2013/0210430 A1* 8/2013 Park ...................... H04W 68/02 455/435.1
2014/0169251 A1* 6/2014 Lee ................... H04W 56/0015 370/311
2015/0271724 A1* 9/2015 Kotreka ................ H04W 48/20 370/331
2019/0327669 A1* 10/2019 Liu ...................... H04B 7/0695
2020/0137717 A1* 4/2020 Liu ....................... H04W 68/02
2020/0383083 A1* 12/2020 Edge ..................... G01S 5/0018
(Continued)

FOREIGN PATENT DOCUMENTS

CN 112789914 A * 5/2021 .......... H04W 68/005
WO WO-2020076460 A1 * 4/2020 .......... H04W 68/005

OTHER PUBLICATIONS

International Search Report and Written Opinion—PCT/US2024/054456—ISA/EPO—Feb. 28, 2025.

*Primary Examiner* — Charles T Shedrick
(74) *Attorney, Agent, or Firm* — Holland & Hart LLP/ QUALCOMM Incorporated

(57) ABSTRACT

Methods, systems, and devices for wireless communications are described. A system may support a delayed response to a paging message to improve paging throughput. A user equipment (UE) may receive, at a first layer of the UE and from a second layer of the UE, a first signal indicating a delay associated with a paging response for the UE. The UE may operate in a first state based on the first signal. The first state may be associated with a pending paging response and a reset of one or more operation parameters of the UE to support the delay associated with the paging response. The UE may transition, after the delay based on satisfaction of one or more paging response conditions, from the first state to a second state associated with initiation of the paging response. The UE may respond to a paging request after transitioning to the second state.

30 Claims, 14 Drawing Sheets

(56) References Cited

U.S. PATENT DOCUMENTS

| | | | | |
|---|---|---|---|---|
| 2020/0383086 | A1* | 12/2020 | Ianev | H04W 68/005 |
| 2021/0345291 | A1* | 11/2021 | Palenius | H04W 60/04 |
| 2021/0368475 | A1 | 11/2021 | Liu | |
| 2023/0018140 | A1* | 1/2023 | Catovic | H04W 68/02 |
| 2023/0037983 | A1* | 2/2023 | Catovic | H04B 7/18504 |
| 2023/0136426 | A1* | 5/2023 | Cheng | H04W 40/24 |
| 2023/0345416 | A1* | 10/2023 | Chin | H04W 76/10 |

* cited by examiner

DELAYED SERVICE FOR PAGING REQUESTS

FIELD OF TECHNOLOGY

The following relates to wireless communications, including delayed service for paging requests.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support delayed service for paging requests. For example, the described techniques provide for a delayed response to or service of a paging message to provide time to alert a user of the incoming page, time for communication conditions to improve, or both. In some examples, a user equipment (UE) may receive a paging request. The paging request may be forwarded from a physical layer of the UE to a non-access stratum (NAS) layer. In response to the paging request, the UE may enter a service request initiated state, which may be a state in which the UE may be prepared to respond to a paging request. The UE may transition to a state associated with a pending paging response based on lower layer signaling indicating reduced channel conditions, a failed random access procedure, or both. Additionally, or alternatively, the UE may receive a pre-paging message, and the UE may transition directly to the response pending state based on the pre-paging message. The pre-paging message may be a may be conveyed via a more robust signal than a paging message, such that the pre-paging message may be received in low coverage scenarios. The UE may reset one or more operating parameters and begin a timer in accordance with the paging response pending state to facilitate a delay associated with a paging response by the UE. In some examples, an upper layer of the UE may alert a user of reduced channel conditions in response to the lower layer signaling or the pre-paging message. The UE may transition from the paging response pending state to the paging response initiated state based on one or more paging response conditions being satisfied. The paging response conditions may include expiration of the timer, the signal coverage of the UE level being below a threshold, a signal from an upper layer of the UE, or any combination thereof.

The UE may thereby delay service of a paging request to provide time for movement by a user, improved channel conditions, or both.

A method for wireless communications by a UE is described. The method may include receiving, at a first layer of the UE, an indication of a paging request, receiving, at the first layer of the UE and from a second layer of the UE, a first signal indicating a delay associated with a paging response to the paging request for the UE, initiating a paging response timer based on the first signal indicating the delay, where the paging response timer is associated with a pending paging response and with a reset of one or more operation parameters of the UE, transitioning, after the delay, to a state associated with initiation of the paging response based on satisfaction of one or more paging response conditions, where the state associated with initiation of the paging response is a state in which further service requests are ignored or buffered, and responding to a paging request after transitioning to the state associated with initiation of the paging response.

A UE for wireless communications is described. The UE may include one or more memories storing processor executable code, and one or more processors coupled with the one or more memories. The one or more processors may individually or collectively be operable to execute the code to cause the UE to receive, at a first layer of the UE, an indication of a paging request, receive, at the first layer of the UE and from a second layer of the UE, a first signal indicating a delay associated with a paging response to the paging request for the UE, initiate a paging response timer based on the first signal indicating the delay, where the paging response timer is associated with a pending paging response and with a reset of one or more operation parameters of the UE, transition, after the delay, to a state associated with initiation of the paging response based on satisfaction of one or more paging response conditions, where the state associated with initiation of the paging response is a state in which further service requests are ignored or buffered, and respond to a paging request after transitioning to the state associated with initiation of the paging response.

Another UE for wireless communications is described. The UE may include means for receiving, at a first layer of the UE, an indication of a paging request, means for receiving, at the first layer of the UE and from a second layer of the UE, a first signal indicating a delay associated with a paging response to the paging request for the UE, means for initiating a paging response timer based on the first signal indicating the delay, where the paging response timer is associated with a pending paging response and with a reset of one or more operation parameters of the UE, means for transitioning, after the delay, to a state associated with initiation of the paging response based on satisfaction of one or more paging response conditions, where the state associated with initiation of the paging response is a state in which further service requests are ignored or buffered, and means for responding to a paging request after transitioning to the state associated with initiation of the paging response.

A non-transitory computer-readable medium storing code for wireless communications is described. The code may include instructions executable by one or more processors to receive, at a first layer of the UE, an indication of a paging request, receive, at the first layer of the UE and from a second layer of the UE, a first signal indicating a delay associated with a paging response to the paging request for the UE, initiate a paging response timer based on the first signal indicating the delay, where the paging response timer is associated with a pending paging response and with a reset of one or more operation parameters of the UE, transition, after the delay, to a state associated with initiation of the paging response based on satisfaction of one or more paging response conditions, where the state associated with initiation of the paging response is a state in which further service requests are ignored or buffered, and respond to a paging request after transitioning to the state associated with initiation of the paging response.

Some examples of the method, UE, and non-transitory computer-readable medium described herein may further include operations, features, means, or instructions for operating in a first state associated with the paging response timer and associated with a pending paging response, where the state associated with initiation of the paging response includes a second state.

Some examples of the method, UE, and non-transitory computer-readable medium described herein may further include operations, features, means, or instructions for receiving the paging request, operating in the second state based on receipt of the paging request, monitoring, at the first layer of the UE, for the first signal while operating in the second state, and transitioning from the second state to the first state based on the first signal indicating the delay, where initiating the paging response timer may be based on transitioning to the first state.

Some examples of the method, UE, and non-transitory computer-readable medium described herein may further include operations, features, means, or instructions for receiving a signal indicating an activation of a delayed paging response procedure for the UE, where operation in the first state may be further based on the activation of the delayed paging response procedure.

In some examples of the method, UE, and non-transitory computer-readable medium described herein, the first signal may be based on a failure of a random-access procedure by the UE, a failure of a signal coverage level for the UE to satisfy a threshold signal coverage level, or both.

In some examples of the method, UE, and non-transitory computer-readable medium described herein, receiving the first signal at the first layer of the UE may include operations, features, means, or instructions for receiving, at the first layer of the UE and from the second layer of the UE, a pre-paging signal, where the pre-paging signal indicates the paging request and the delay associated with the paging response.

In some examples of the method, UE, and non-transitory computer-readable medium described herein, the satisfaction of the one or more paging response conditions includes an expiration of the paging response timer, the paging response timer associated with a first state.

Some examples of the method, UE, and non-transitory computer-readable medium described herein may further include operations, features, means, or instructions for receiving, at the first layer of the UE and from the second layer of the UE, a second signal that indicates the satisfaction of the one or more paging response conditions, where the one or more paging response conditions include a coverage level of the UE satisfying a threshold coverage level, an expiration of the paging response timer, or both, and where the UE transitions to the state associated with the initiation of the paging response based on the second signal.

Some examples of the method, UE, and non-transitory computer-readable medium described herein may further include operations, features, means, or instructions for receiving, at the first layer of the UE and from an upper layer of the UE, a third signal that indicates the paging request, where the satisfaction of the one or more paging response conditions may be based on the third signal.

Some examples of the method, UE, and non-transitory computer-readable medium described herein may further include operations, features, means, or instructions for receiving, at the first layer of the UE and from the second layer of the UE, a second signal that indicates that a signal coverage level of the UE satisfies a threshold signal coverage level and forwarding, from the first layer of the UE and to the upper layer of the UE, the second signal, where the third signal from the upper layer may be based on the second signal.

Some examples of the method, UE, and non-transitory computer-readable medium described herein may further include operations, features, means, or instructions for transmitting, from the first layer of the UE and to an upper layer of the UE, a notification that indicates receipt of the first signal at the first layer of the UE and outputting, from the upper layer of the UE based on the notification, an alert indicating that the paging response may be delayed for a time period or until channel conditions at the UE satisfy a threshold.

Some examples of the method, UE, and non-transitory computer-readable medium described herein may further include operations, features, means, or instructions for transmitting a registration request, a serving request, or both based on the transition to the state associated with the initiation of the paging response.

Some examples of the method, UE, and non-transitory computer-readable medium described herein may further include operations, features, means, or instructions for establishing, before receipt of the first signal, a connection between the UE and a network, where, based on establishment of the connection between the UE and the network, the one or more operation parameters of the UE that may be reset in accordance with the paging response timer include one or more serving request states, one or more timers, or any combination thereof.

Some examples of the method, UE, and non-transitory computer-readable medium described herein may further include operations, features, means, or instructions for initiating a registration attempt with a network, where the first signal may be received before completion of the registration attempt, and where, based on receipt of the first signal before the completion of the registration attempt, the one or more operation parameters of the UE that may be reset in accordance with the paging response timer include a registration request, one or more timers, or any combination thereof.

In some examples of the method, UE, and non-transitory computer-readable medium described herein, the first layer of the UE includes a non-access stratum layer and the second layer of the UE includes a radio resource control layer.

DETAILED DESCRIPTION

Figure 1:
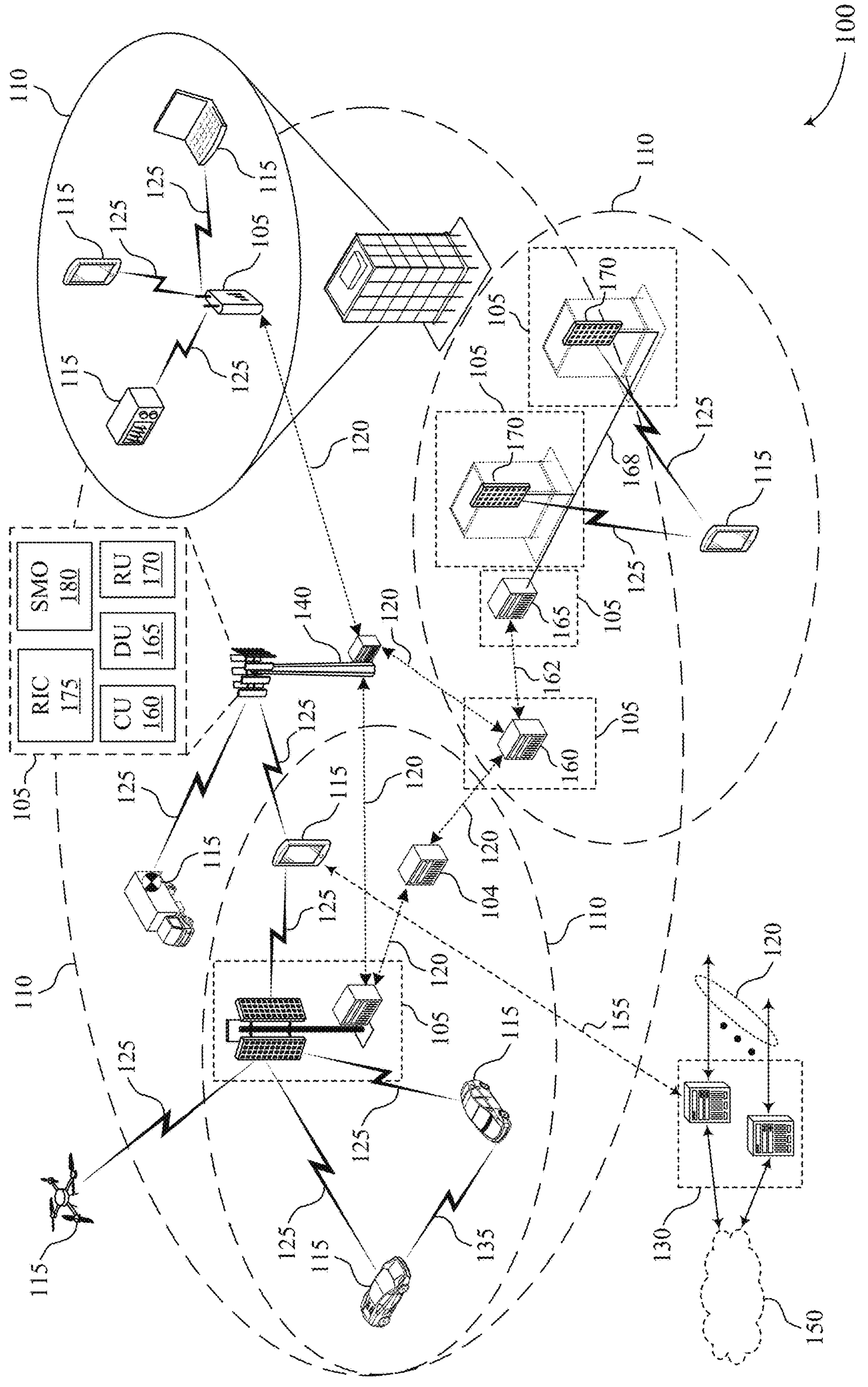
FIG. 1 shows an example of a wireless communications system that supports delayed service for paging requests in accordance with one or more aspects of the present disclosure.

In some wireless communications systems, to initiate a call or other session, a user may move a user equipment (UE) into a preferred location that minimizes physical blockage (e.g., to avoid physical barriers which block signals), which may improve throughput of the call. However, the user may not be aware of incoming calls (e.g., mobile terminated (MT) calls) or other sessions and may not be able to perform the same movement. For example, the UE may successfully receive a paging message (e.g., assuming sufficient downlink budget), but may fail to complete a random access procedure due to a weak uplink connection, such that the call may fail to be received at the UE. As another example, the UE may fail to receive the paging message due to a weak downlink connection (e.g., if the smartphone is blocked by clothing or accessories). Such inability to receive and/or connect to mobile terminated sessions may diminish the user experience.

Techniques described herein provide for a delayed response to or service of a paging message to provide time to alert a user of the incoming page, time for communication conditions to improve, or both. In some examples, a UE may receive a paging request. The paging request may be forwarded from a physical layer of the UE to a non-access stratum (NAS) layer. In response to the paging request, the UE may enter a second state (e.g., mode) associated with an initiation of a paging response, in which the UE may be prepared to respond to the paging request. The UE may transition to a first state (e.g., mode) based on lower layer signaling indicating reduced channel conditions, a failed random access procedure, or both. The first state may be associated with a pending paging response or a delay in responding to the paging message. Additionally, or alternatively, the UE may receive a pre-paging message, which may be conveyed via a more robust message than a paging message (e.g., in low coverage scenarios), and the UE may transition directly to the first state based on the pre-paging message. Although some examples herein are described with reference to a UE operating in multiple states, it is to be understood that a UE may support a delayed response to a paging request in accordance with the teachings herein through operations that occur within the context of a single state or while operating in a stateless manner (e.g., by performing one or more actions described herein, without any association between such actions and any formal states).

The UE may reset one or more operating parameters and begin a timer in accordance with the first state to facilitate a delay associated with a paging response by the UE. In some examples, an upper layer of the UE may alert a user of reduced channel conditions in response to the lower layer signaling or the pre-paging message. The UE may transition from the first state to the second state based on one or more paging response conditions being satisfied. The paging response conditions may include expiration of the timer, the signal coverage of the UE level being below a threshold, a signal from an upper layer of the UE, or any combination thereof. The UE may thereby delay service of a paging request to provide time for movement by a user, improved channel conditions, or both.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to delayed service for paging requests.

FIG. 1 shows an example of a wireless communications system 100 that supports delayed service for paging requests in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support delayed service for paging requests as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage NAS functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may provide support for a delayed response to or service of a paging message to provide time to alert a user of the incoming page, time for communication conditions to improve, or both. In some examples, a UE 115 may receive a paging request. The paging request may be forwarded from a physical layer of the UE 115 to a NAS layer. In response to the paging request, the UE 115 may enter a service request initiated state, in which the UE 115 may monitor for signaling to the NAS layer from a lower layer, such as a RRC layer. The UE 115 may transition to a response pending state based on the lower layer signaling indicating reduced channel conditions, a failed random access procedure, or both. Additionally, or alternatively, the UE 115 may receive a pre-paging message, which may be a more robust message than a paging message, and the UE 115 may transition directly to the response pending state based on the pre-paging message.

The UE 115 may reset one or more operating parameters and begin a timer in accordance with the paging response pending state to facilitate a delay associated with a paging response by the UE 115. In some examples, an upper layer of the UE 115 may alert a user of reduced channel conditions in response to the lower layer signaling or the pre-paging message. The UE 115 may transition from the paging response pending state to the paging response initiated state based on one or more paging response conditions being satisfied. The paging response conditions may include expiration of the timer, the signal coverage of the UE 115 level being below a threshold, a signal from an upper layer of the UE 115, or any combination thereof. The UE 115 may thereby delay service of a paging request to provide time for movement by a user, improved channel conditions, or both.

Figure 2:
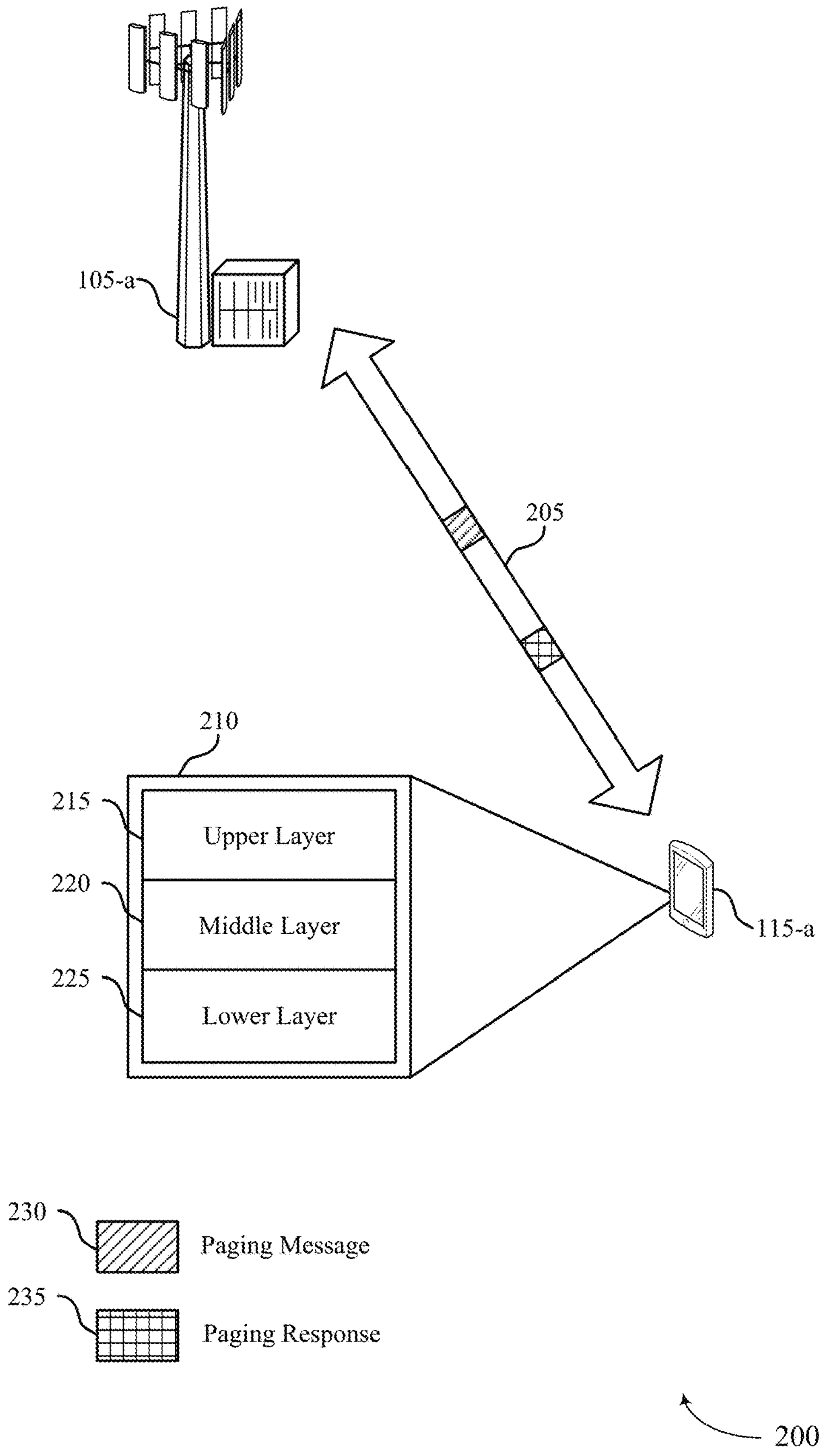
FIG. 2 shows an example of a wireless communications system that supports delayed service for paging requests in accordance with one or more aspects of the present disclosure.

FIG. 2 shows an example of a wireless communications system 200 that supports delayed service for paging requests in accordance with one or more aspects of the present disclosure. In some cases, the wireless communications system 200 may implement or be implemented by aspects of the wireless communications system 100. For example, the wireless communications system 200 may include one or more UEs 115 (e.g., a UE 115-*a*) and one or more network entities 105 (e.g., a network entity 105-*a*), which may be examples of the corresponding devices as described herein. The UE 115-*a* and the network entity 105-*a* may communicate via a wireless connection 205. In some cases, the network entity 105-*a* may be an example of a base station, a remote radio head, a transmission and reception point (TRP), a non-terrestrial network (NTN) entity (e.g., a satellite), or any combination thereof.

The UE 115-*a* may operate in accordance with a protocol stack 210, which may include one or more protocol layers (which in some cases may be referred to simply as layers for brevity). The layers may be organized into an upper layer 215, a middle layer 220, and a lower layer 225. Generally, as used herein, a layer may be a single protocol layer or a collection of protocol layers and hence may include one or more individual layers. Thus, for example, one or more relatively lower layers may collectively perform functionalities ascribed herein to lower layer 225, one or more relatively upper layers may collectively perform functionalities ascribed herein to upper layer 215, or one or more in-between layers may collectively perform functionalities ascribed herein to middle layer 220. In some cases, each layer of the one or more layers in the protocol stack 210 may be an example of a protocol layer at the UE 115-*a*. For example, the upper layer 215 may be an example of a user interface (e.g., a user of the UE 115-*a* may issue commands and provide feedback via the upper layer 215). The middle layer 220 may be an example of a NAS layer. The lower layer 225 may include or may be an example of a RRC layer, a MAC layer, one or more physical layers, or any combination thereof.

The UE 115-*a* may receive, via the wireless connection 205, a paging message 230 from the network entity 105-*a*. After receiving the paging message 230, the UE may decode the paging message 230 and generate a paging response 235 to be sent to the network entity 105-*a*. Thus, the UE 115-*a* transmit, via the wireless connection 205 and in response to the paging message 230, the paging response 235 in accordance with decoding the paging message 230.

In some implementations, the wireless communications system 200 may support an NTN. For example, the network entity 105-*a* may be an example of a satellite network entity 105-*a* (e.g., a low earth orbit (LEO) satellite, or some other type of satellite). The satellite network entity 105-*a* may support outputting the paging message 230 and receiving the paging response 235. Thus, the wireless communications system 200 may be supported by a terrestrial network entity (e.g., a grounded network entity) as well as a non-terrestrial network entity (e.g., a satellite).

In some wireless communications systems, to initiate a call or other session, a user may move a UE into a preferred location that minimizes physical blockage (e.g., to avoid physical barriers which block signals, especially when an uplink link budget of the UE has thin margins), which may improve throughput of the call. For example, a user may exit an elevator before initiating a call, among other examples. In some cases, for an incoming call (e.g., a mobile terminated (MT) call), after receiving a paging message via downlink signaling, the UE may initiate a random access procedure (e.g., a random access channel (RACH) procedure) to move to a connected state without any indication to or input from a user. After successful completion of bearer setup, a user interface of the UE may notify the user about the incoming call (e.g., via ringing, vibration, notification, etc.). However, the user may not be aware of incoming calls or other sessions before the random access procedure succeeds. For example, the UE may successfully receive a paging message (e.g., assuming sufficient downlink budget), but may fail to complete the random access procedure due to a weak uplink connection, such that the call may fail to be received at the UE. As another example, the UE may fail to receive the paging message due to a weak downlink connection (e.g., if the smartphone is blocked by clothing or accessories). For example, in an NTN system, the downlink may be relatively weak, in some cases, and the UE may fail to receive the paging message. Such inability to receive and/or connect to mobile terminated sessions may diminish the user experience.

In some cases, a downlink connection at the UE 115-*a* may be sufficient to establish a call session but the uplink connection at the UE 115-*a* may be insufficient to establish the call session. For example, the UE 115-*a* may successfully decode the paging message 230, but the uplink connection at the UE 115-*a* may be inadequate for initiating or successfully completing a random access procedure. In such cases, the UE 115-*a* may perform procedures at the protocol stack 210. In one example, the lower layer 225 (e.g., the RRC layer) may transmit a paging indication (e.g., without delay) to the middle layer 220 (e.g., the NAS layer). The paging indication may indicate reception of the paging message 230 at the UE 115-*a*. After receiving the paging indication, the middle layer 220 may transmit, to the lower layer 225, an instruction for a connection (e.g., an RRC connection) to transmit a request. The instruction may indicate that the lower layer 225 may transmit a request (e.g., resume) after a delay duration. In some examples, the lower layer 225 may transmit the paging indication that indicates reception of the paging message 230 to the RRC layer after the delay duration. A communication module of the UE 115-*a* (e.g., at the middle layer 220) may transmit an alert indication to the upper layer 215 (e.g., the user interface). The alert indication may instruct the upper layer 215 to output an alert to the user to take an action to improve coverage (e.g., to move to a better location). The alert may be an audible alert, a visible alert, a vibration, or any combination thereof. The alert may additionally, or alternatively, include an automatic count-down timer after which the UE 115-*a* may initiate and transmit the paging response 235. Alternatively, the upper layer 215 may allow the user to manually initiate the paging response 235 (e.g., or a call response procedure).

The UE 115-*a* may alert the user about an incoming paging message based on one or more factors. In some cases, alerting the user may be based on a reference signal received power (RSRP) or other channel conditions after receiving and decoding the paging message 230. For example, if the RSRP or other channel conditions are below (e.g., poorer than) a threshold, the UE 115-*a* may alert the user, and otherwise the UE 115-*a* may refrain from alerting the user. Alternatively, the threshold may correspond to (e.g., may be equal to) a threshold signal quality level (e.g., q-RxLevMin). In some cases, the threshold may correspond to an offset with respect to the threshold signal quality level. In such cases, the UE 115-*a* may alert the user if the channel conditions are poorer than (e.g., below) a particular margin (e.g., equal to the offset) of the threshold signal quality level. In some cases, alerting the user may be based on attempting to transmit an uplink signal and detecting an uplink failure by the UE 115-*a*. For example, the UE 115-*a* may attempt to transmit the uplink signal (e.g., as the UE was already camping in the cell), detect the uplink failure due to insufficient uplink coverage, and alert the user about the incoming paging message. After indicating the insufficient uplink coverage to the user, the UE 115-*a* may attempt to transmit the uplink signal (e.g., for a mobile originated (MO) call or another call session). An attempt counter may be configured or indicated at the UE. The attempt counter may correspond to a quantity of RACH attempts, a quantity of NAS service request attempts, or any combination thereof (e.g., the attempt counter may count the quantity of RACH and/or NAS service request attempts).

In some cases, the alert may indicate to the user to take an action to improve coverage (e.g., taking the user's phone out of a pocket or a backpack). The alert may additionally, or alternatively, indicate to the user to move to a location where there is more likely to be better coverage (e.g., moving outside or to an open area anticipating a line of sight link).

A network configuration may define (e.g., specify) parameters for the UE 115-*a*. For example, the network configuration may define a parameter for a delay duration between the (downlink) paging message 230 and the (uplink) paging response 235. In some cases, the delay duration may be fixed or may be configurable by the network using signaling such as system information block (SIB) broadcast, dedicated RRC or MAC control element (MAC-CE) signaling, or any combination thereof. A NAS layer may configure and control the delay duration. Additionally, or alternatively, the delay duration may be indicated or inferred based on an indication in the paging message 230. The upper layer 215 may begin a count-down timer based on the value of the delay duration. Expiration of the count-down timer may indicate starting an uplink procedure (e.g., an attempt to transmit the paging response 235). The upper layer 215 may begin the count-down timer after the UE 115-*a* receives the paging message 230 (e.g., the timer may begin at a time value in the range of a few tens of seconds to minutes). In some cases, the UE 115-*a* may cancel or stop the count-down timer if the UE 115-*a* detects that the user has taken an action to improve coverage (e.g., takes the phone out or moves to better coverage) before the expiration of the count-down timer. In such cases, the UE 115-*a* may attempt to transmit the paging response 235 after canceling or stopping the count-down timer. The UE may stop or cancel the count-down timer based on user input or based on a coverage level of the UE satisfying a threshold. A coverage level may in some cases be a signal strength or other signal quality metric (e.g., a received signal power, such as an RSRP). In some cases, the network entity 105-*a* may indicate to a calling UE 115 about the potential delay to connect to the called UE 115 (e.g., the UE 115-*a*) based on the delay duration.

In some cases, the network configuration may define a threshold coverage value for determining whether the UE 115-*a* has sufficient uplink coverage. If the UE 115-*a* has an uplink coverage at or above the threshold coverage value, the UE 115-*a* may refrain from alerting the user. If the UE 115-*a* has an uplink coverage below the threshold coverage value, the UE 115-*a* may alert the user. The threshold coverage value may be an example of a signal strength threshold, such as an RSRP threshold, or some other type of signal strength threshold. The threshold coverage value may be configurable by the network entity 105-*a* (e.g., via SIB broadcast, dedicated RRC or MAC-CE signaling or NAS signaling). In some cases, the network configuration may extend core network timers to enable the network to accommodate the delay in the paging response 235. For example, a service request timer (e.g., timer T3517) initiated after transmission of a service request message may be extended from 15 seconds to one minute to accommodate the delay.

After the paging message 230, the UE 115-*a* may stop a NAS level timer (e.g., timer T3346) if the NAS level timer is running. In some cases, if a control plane optimization (e.g., control plane CIoT 5GS optimization) is not used by the UE 115-*a*, the UE 115-*a* may initiate a service request procedure over a wireless communication channel (e.g., the wireless connection 205) to respond to the paging message 230 if the UE 115-*a* is in a registered state (e.g., 5GMM-REGISTERED.NORMAL-SERVICE or 5GMMREGISTERED.NON-ALLOWED-SERVICE) and the UE 115-*a* is in an idle state (e.g., 5GMM-IDLE state) without a suspend indication. To clarify, the UE 115-*a* may invoke the service request procedure if the UE 115-*a*, in the idle state, receives the paging message 230 from the network entity 105-*a*. The UE 115-*a* may initiate a service request procedure over the wireless connection 205 to respond to the paging message 230. Similarly, the UE 115-*a* may initiate a registration procedure for mobility and periodic registration update over the wireless connection 205 to respond to the paging message 230. The UE 115-*a*, in a particular register state (e.g., 5GMM-REGISTERED) may initiate the registration procedure for mobility and periodic registration update by sending a registration request message to an access and mobility management function (AMF) when the UE 115-*a* in a registration update attempt state (e.g., 5GMM-REGISTERED.ATTEMPTING-REGISTRATION-UPDATE) either receives the paging message 230 or the UE 115-*a* receives a notification message with an access type (e.g., an access type indicating 3GPP access over the non-3GPP access for packet data unit sessions associated with 3GPP access). In some cases, the UE 115-*a* may proceed normally (e.g., refrain from responding to the paging message 230) if the UE 115-*a* is in the idle state (e.g., 5GMM-IDLE state) with a suspend indication.

In some cases, if a control plane optimization (e.g., control plane CIoT 5GS optimization) is used by the UE 115-*a*, the UE 115-*a* may initiate a service request procedure if the UE 115-*a* is in the idle state (e.g., 5GMM-IDLE state) without a suspend indication. The UE 115-*a* may initiate a registration procedure for mobility and periodic registration update over the wireless connection 205. If the UE 115-*a* is in the idle state (e.g., 5GMM-IDLE state) with a suspend indication, the UE 115-*a* may proceed normally (e.g., refrain from responding to the paging message 230).

Techniques described herein provide for a UE to perform communication procedures at various layers of the UE to generate the paging response 235 in response to receiving a paging message 230. This may provide for improved throughput for paging messages by enabling a UE (e.g., a smartphone) to transition from an insufficient link budget scenario to a sufficient link budget scenario. Further, the techniques described herein may enable the UE to receive paging messages that indicate information to a user (e.g., emergency paging messages).

In some cases, the wireless communications system 200 may support a UE implementation to respond to paging messages, pre-paging messages, or any combination thereof, in relatively poor coverage (e.g., deep coverage). For example, a network configuration (e.g., a configuration at the UE 115-*a*) described herein may define one or more states (e.g., one or more modes) at the middle layer 220 (e.g., the NAS layer). The one or more states (or modes) may include a paging response initiated state and a paging response pending state, which may also be referred to as a second state and a first state, respectively, in some examples herein. Although such sates are described herein in the context of some examples, it is to be understood that a UE 115 *a* may support a delayed response to a paging request in accordance with the techniques herein regardless of whether one or more actions of the UE 115-*a* are formally associated with one or more states.

The UE 115-*a* may transition to (or enter) a state of the one or more states if the UE 115-*a* attempted a service request (e.g., the paging response 235) in response to the paging message 230, but received an indication from another layer (e.g., the middle layer 220 or the lower layer 225) indicating relatively poor channel conditions (e.g., bad radio condition). After receiving the paging message 230, the middle layer 220 (e.g., NAS) may mark the service request as pending, start a new timer, and attempt the service request after expiration of the new timer based on entering the paging response pending state, based on receiving the indication, or any combination thereof. Additionally, the UE 115-*a* may transmit an indication (or alert) to the upper layer 215, which may alert the user, via a notification (e.g., an alert ring), regarding poor coverage or that the device has entered the paging response pending state.

In the following description of FIGS. 3-6, various operations are described with reference to the protocol stack 210 of the UE 115-*a*. For example, the UE may communicate signals between the RRC layer, the NAS layer, and the MAC layer. The UE 115-*a* may exchange service messages between the NAS layer and the upper layer 215 (e.g., the user interface) of the UE 115-*a*. The UE 115-*a* may additionally, or alternatively, initiate one or more timers at the RRC layer and at the NAS layer. The AMF may be synchronized with the one or more timers at the NAS layer. Further, the UE 115-*a* may include an application level switch (e.g., in a user interface of the UE 115-*a*) to enable or disable the operations described herein. The NAS layer may behave according to the procedures described based on capability information of the UE 115-*a* and if the application level switch is enabled.

Figure 3:
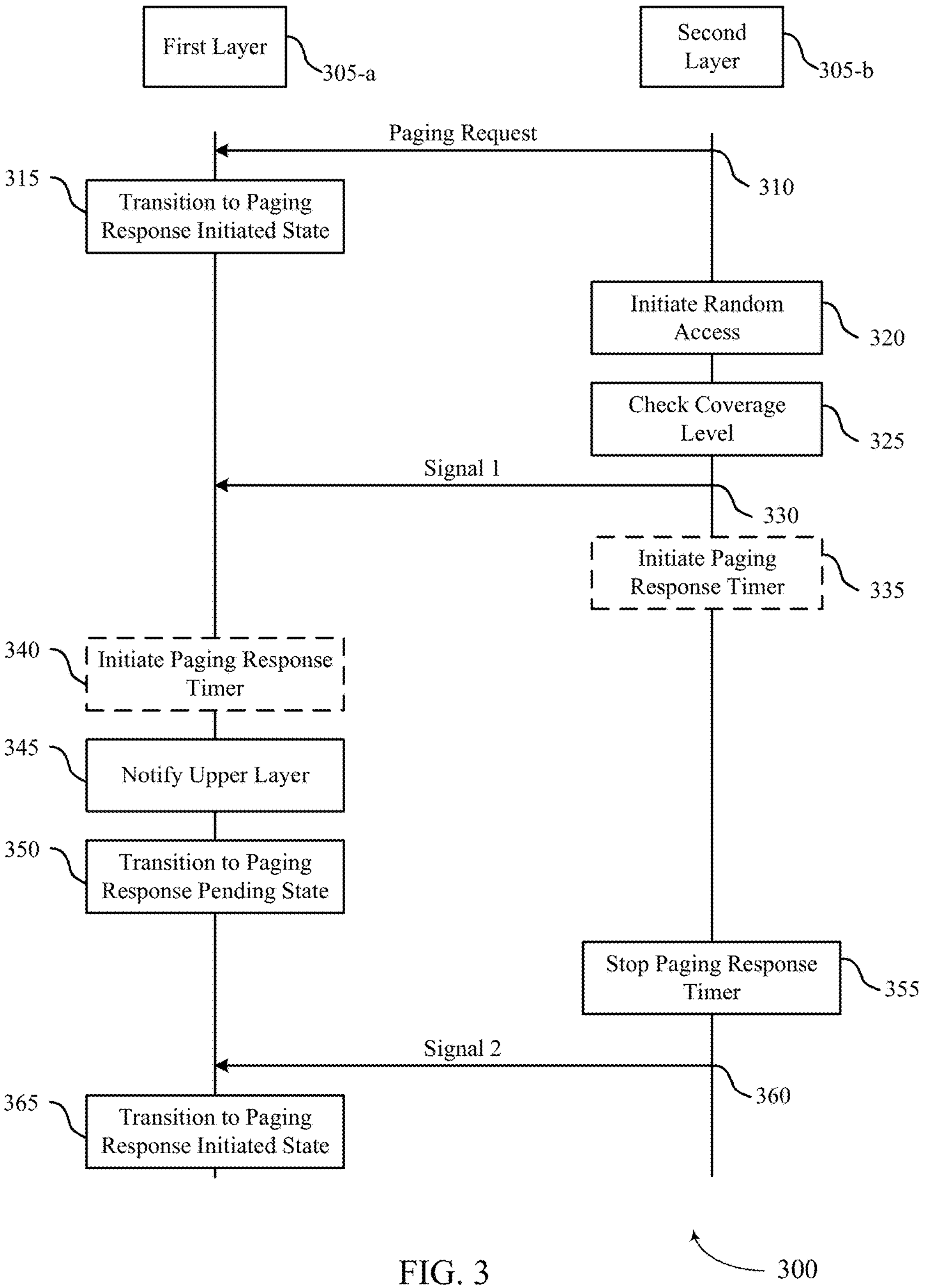
FIGS. 3-6 show example process flows that support delayed service for paging requests in accordance with one or more aspects of the present disclosure.

FIG. 3 shows an example of a process flow 300 that supports delayed service for paging requests in accordance with one or more aspects of the present disclosure. The process flow 300 includes a first layer 305-*a* and a second layer 305-*b*, which may be examples of the protocol stack layers of a UE 115 as described with respect to FIGS. 1 and 2. The first layer 305-*a* may be a NAS layer of a UE 115 and the second layer 305-*b* may be an RRC layer of the UE 115, in some examples. Although the first layer 305-*a* and the second layer 305-*b* may be shown to perform operations and signaling for simplicity and clarity, it should be interpreted that the UE 115 may perform the operations and signaling at each layer, or any other layer not illustrated. Further, transmitting and receiving signals and messages between the layers of the UE 115 may be understood as internally exchanging signals or messages between the layers of the UE 115.

In the following description of the process flow 300, the operations between the first layer 305-*a* and the second layer 305-*b* may be performed in a different order than the example order shown. Some operations may also be omitted from the process flow 300, and other operations may be added to the process flow 300. Further, although some operations or signaling may be shown to occur at different times for discussion purposes, these operations may actually occur at the same time. Further, each layer discussed with reference to FIG. 3 may include one or more individual layers. That is, one or more relatively lower layers may collectively perform functionalities ascribed herein to second layer 305-*b*, one or more relatively upper layers may collectively perform functionalities ascribed herein to an upper layer (e.g., as discussed at 345), or one or more in-between layers may collectively perform functionalities ascribed herein to first layer 305-*a*.

In some cases, before the UE 115 receives a paging message, the UE 115 may be in an idle state (e.g., 5GMM-IDLE), a registered normal service state (e.g., 5GMM-REGISTERED.NORMAL-SERVICE), or a non-allowed service state (e.g., 5GMM-REGISTERED.NON-ALLOWED-SERVICE). For example, the UE 115 may have previously registered with and established a connection with a network entity 105 and may operate in the idle state, while the UE 115 may be performing regular service operations with the network entity 105 and may operate in the registered normal service state. In some other cases, the UE 115 may be in an idle state (e.g., 5GMM-IDLE) or a registration attempt update state (e.g., 5GMM-REGISTERED.ATTEMPTING-REGISTRATION-UPDATE). In other words, the UE 115 may be actively attempting to perform a registration update by sending a request and may operate in the registration attempt update state. In some cases, the UE 115 may have failed to complete service to the paging request (e.g., possibly RACH or msg3 failure).

At 310, the first layer 305-*a* may receive a paging request from the second layer 305-*b*. For example, the UE 115 may receive a paging message (e.g., the paging message described with reference to FIG. 2) at a physical layer of the UE 115, and the message may be forwarded to the first layer 305-*a*.

At 315, at the first layer 305-*a*, the UE 115 may transition to a paging response initiated state. The paging response initiated state may indicate that the UE 115 has received the paging message and may prepare a paging response. If the UE has registered with the network, the UE may enter a service request initiated state (e.g., 5G-MM-SERVICE-REQUEST-INITIATED) and may initiate a first timer associated with the service request (e.g., timer T3517, or some other timer) at the same time as or before the UE 115 transitions to the paging response initiated state. Additionally, or alternatively, if the UE is in the process of attempting to register with the network when the paging request is received, the UE 115 may initiate a registration procedure (e.g., as described herein with reference to FIG. 2) for mobility and periodic update at the same time as or before the UE 115 transitions to the paging response initiated state.

At 320, the second layer 305-*b* (e.g., the RRC layer) may instruct a MAC layer of the UE 115 to perform a random access procedure. In some cases, the random access procedure may fail, and the MAC layer may transmit an indication of the failure of the random access procedure to the second layer 305-*b*.

At 325, after receiving the indication of the failure of the random access procedure, the second layer 305-*b* may check (e.g., measure) a coverage level (e.g., a signal coverage level) of the UE 115 compared to a coverage level threshold (e.g., the coverage level threshold may be similar to the threshold signal quality level described with reference to FIG. 2). In some cases, the second layer 305-*b* may determine that the coverage level is below the coverage level threshold.

At 330, the second layer 305-*b* may transmit a first signal (e.g., signal 1) to the first layer 305-*a*. The first signal may include an indication of an expected delay, a delay duration of the expected delay, or any combination thereof based on the failure of the random access procedure, the failure of the coverage level to satisfy the threshold, or both. In some cases, the first signal may include an estimate of time (e.g., the delay duration) after which the channel conditions (e.g., radio propagation conditions) may improve.

At 335, in some examples, the second layer 305-*b* may initiate a paging response timer if a set of start conditions are satisfied. The set of start conditions may include a failure of an RRC setup request, an RRC setup establishment cause being associated with mobile terminated voice or data (e.g., if the RRC setup establishment was caused by an incoming call session or the like), the coverage level being below the coverage level threshold, or any combination thereof. A default value of the paging response timer may be based on the estimate of time after which the channel conditions may improve. In some cases, the second layer 305-*b* may transmit the first signal to the first layer 305-*a* after, before, or at the same time as initiating the paging response timer.

At 340, in some examples, the first layer 305-*a* may initiate the paging response timer if the UE 115 is in a paging response initiated state (e.g., 5GMM-PAGING-RESPONSE-INITIATED state). In some cases, the first layer 305-*a* may initiate the paging response timer if the first layer 305-*a* received the first signal from the second layer 305-*b*. For example, the first layer 305-*a* may initiate the paging response timer based on the first signal including an indication to initiate the paging response timer.

At 345, the first layer 305-*a* may transmit an alert notification to an upper layer of the UE 115 (e.g., a user interface of the UE 115). The alert notification may indicate that the user may experience a delay in a call session due to the coverage level of the UE 115 being below the coverage level threshold, due to a failure of a RACH procedure, or for another reason causing the call session to fail. Additionally, or alternatively, the alert notification may indicate that the UE 115 has transitioned to the paging response initiated state, that the UE 115 may prepare a paging response, or any combination thereof. In some cases, the alert notification may include an option for the user to accept or reject transmitting the paging response. For example, the user may determine to transmit a paging response immediately regardless of the reduced channel conditions, or the user may determine to refrain from transmitting a paging response, or the user may determine to transmit the paging response after the delay.

At 350, at the first layer 305-*a*, the UE 115 may transition to a paging response pending state. Transitioning to the paging response pending state may be based on initiating the paging response timer. The paging response pending state may indicate that the UE 115 has received the paging message and may be preparing the paging response during a delay period. The UE 115 may reset service request states (e.g., the service request initiated state) and service request timers (e.g., timer T3517) based on entering the paging response pending state. In some cases, if the UE is attempting to register to the network prior to 315, the UE may cancel (e.g., drop) the registration request and may reset one or more timers to respective values prior to 315 based on entering the paging response pending state. While in the paging response pending state, the UE 115 may refrain from allowing service requests or registration requests in response to paging or pre-paging received. In some cases, while in the paging response pending state, the UE 115 may allow service requests or registration requests due to a user request to make an emergency call. In such cases, the first layer 305-*a* (e.g., the NAS layer) may reset the states and timers associated with the service requests or registration requests.

At 355, the second layer 305-*b* may stop (e.g., cancel) the paging response timer if the coverage level of the UE 115 is above the threshold coverage level or if the paging response timer expires. At 360, in some examples, the second layer 305-*b* may transmit a second signal (e.g., signal 2) to the first layer 305-*a*. The second signal may include an indication that the paging response timer expired or that the coverage level of the UE 115 is above the threshold coverage level, or both. In some cases, if the paging response timer expired at the first layer 305-*a*, the second layer 305-*b* may refrain from transmitting the second signal to the first layer 305-*a*. Additionally, or alternatively, in some examples, the second signal may instruct the first layer 305-*a* to stop the paging response timer based on the coverage level of the UE 115 satisfying the threshold coverage level.

At 365, the first layer 305-*a* may transition back to the paging response initiated state based on stopping criteria being met. The stopping criteria may include expiration (e.g., timeout) of the paging response timer, receiving the second signal from the second layer 305-*b*, an indication from the upper layer of the UE 115 (e.g., if the user responds to the alert notification with a rejection), or any combination thereof. In some cases, while the UE 115 is in the paging response initiated state, the UE 115 may respond to the paging request, which may include performing service request procedures or service registration procedures (e.g., perform service to paging request). The paging response initiated state described herein may thereby correspond to one or more operations at the UE 115 that support generation of a response to a paging request, and the paging response pending state described herein may correspond to one or more operations at the UE 115 that support delaying a response to the paging request.

Figure 4:
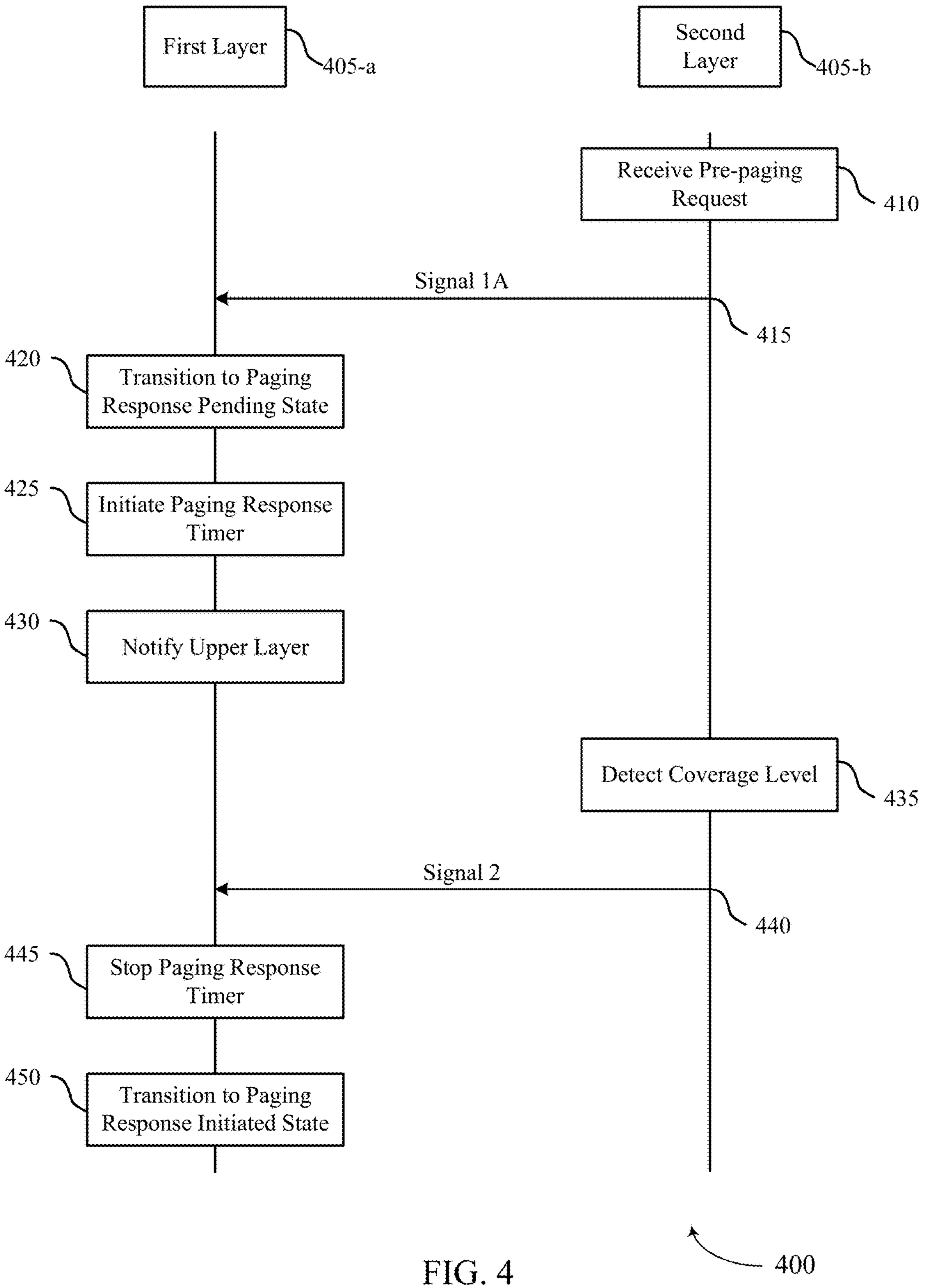

FIG. 4 shows an example of a process flow 400 that supports delayed service for paging requests in accordance with one or more aspects of the present disclosure. The process flow 400 includes a first layer 405-*a* and a second layer 405-*b*, which may be examples of the protocol stack layers of a UE 115 as described with respect to FIGS. 1 and 2. The first layer 405-*a* may be a NAS layer of a UE 115 and the second layer 405-*b* may be an RRC layer of the UE 115. Accordingly, the first layer 405-*a* and the second layer 405-*b* may be examples of corresponding layers described with reference to FIG. 3. Although the first layer 405-*a* and the second layer 405-*b* may be shown to perform operations and signaling for simplicity and clarity, it should be interpreted that the UE 115 may perform the operations and signaling at each layer, or any other layer not illustrated. Further, transmitting and receiving signals and messages between the layers of the UE 115 may be understood as internally exchanging signals or messages between the layers of the UE 115.

In the following description of the process flow 400, the operations between the first layer 405-*a* and the second layer 405-*b* may be performed in a different order than the example order shown. Some operations may also be omitted from the process flow 400, and other operations may be added to the process flow 400. Further, although some operations or signaling may be shown to occur at different times for discussion purposes, these operations may actually occur at the same time. Further, each layer discussed with reference to FIG. 4 may include one or more individual layers. That is, one or more relatively lower layers may collectively perform functionalities ascribed herein to second layer 405-*b*, one or more relatively upper layers may collectively perform functionalities ascribed herein to an upper layer (e.g., as discussed at 430), or one or more in-between layers may collectively perform functionalities ascribed herein to first layer 405-*a*.

In some cases, before the UE 115 receives a paging message, the UE 115 may be in an idle state (e.g., 5GMM-IDLE), a registered normal service state (e.g., 5GMM-REGISTERED.NORMAL-SERVICE), or a non-allowed service state (e.g., 5GMM-REGISTERED.NON-ALLOWED-SERVICE). For example, the UE 115 may have previously registered with and established a connection with a network entity 105 and may operate in the idle state, while the UE 115 may be performing regular service operations with the network entity 105 and may operate in the registered normal service state. In some other cases, the UE 115 may be in an idle state (e.g., 5GMM-IDLE) or a registration attempt update state (e.g., 5GMM-REGISTERED.ATTEMPTING-REGISTRATION-UPDATE). In other words, the UE 115 may be actively attempting to perform a registration update by sending a request and may operate in the registration attempt update state.

At 410, at the second layer 405-*b*, the UE 115 may receive a pre-paging request. The pre-paging request may be a part of the paging message (e.g., similar to the paging message described with reference to FIG. 2) or may be a separate message from a network entity. In some cases, the pre-paging request may be any signal received at the UE 115 that indicates an upcoming paging message for the UE 115. The pre-paging request may be conveyed during relatively poor coverage conditions of the UE 115 (e.g., low coverage scenario). For example, a configuration, format, or other aspect of the pre-paging message may provide for more robust transmission and throughput as compared to the paging message. The second layer 405-*b* (e.g., the RRC layer) may instruct a MAC layer of the UE 115 to perform a random access procedure. In some cases, the random access procedure may fail, and the MAC layer may transmit an indication of the failure of the random access procedure to the second layer 405-*b*. After receiving the indication of the failure of the random access procedure, the second layer 405-*b* may check (e.g., measure) a coverage level (e.g., a signal coverage level) of the UE 115 compared to a coverage level threshold (e.g., the coverage level threshold may be similar to the threshold signal quality level described with reference to FIG. 2). In some cases, the second layer 405-*b* may determine that the coverage level is below the coverage level threshold.

At 415, the second layer 405-*b* may transmit a first signal (e.g., signal 1A) to the first layer 405-*a*. The first signal may include an indication of the pre-paging request. The first signal may include an indication of an expected delay, a delay duration of the expected delay, or any combination thereof based on the failure of the random access procedure, the failure of the coverage level to satisfy the threshold, or both. In some examples, the indication of the pre-paging message may, in itself, indicate the expected delay for responding to the paging message at least because the pre-paging message may be received in relatively poor coverage scenarios (e.g., when a paging message is unable to be received). In some cases, the first signal may include an estimate of time (e.g., the delay duration) after which the channel conditions (e.g., radio propagation conditions) may improve.

At 420, after receiving the first signal from the second layer 405-*b*, the UE may transition, at the first layer 405-*a*, to a paging response pending state. In some cases, if the UE was in the registration attempt update state prior to 410, the UE may cancel (e.g., drop) the registration request and may reset one or more timers to respective values prior to 410 based on entering the paging response pending state. At 425, the first layer 405-*a* may initiate a paging response timer based on receiving the first signal. A default value of the paging response timer may be based on the estimate of time after which the channel conditions may improve.

At 430, the first layer 405-*a* may transmit an alert notification to an upper layer of the UE 115 (e.g., a user interface of the UE 115). The alert notification may indicate that the coverage level of the UE 115 is below the coverage level threshold, that the UE 115 has transitioned to the paging response pending state, that the UE 115 may be preparing a paging response, or any combination thereof. In some cases, the alert notification may include an option for the user to accept or reject transmitting the paging response. For example, the user may determine to transmit a paging response immediately regardless of the reduced channel conditions, or the user may determine to refrain from transmitting a paging response, or the user may determine to transmit the paging response after the delay.

At 435, the second layer 405-*b* may detect (e.g., measure) the coverage level of the UE 115. At 440, if the second layer 405-*b* detects that the coverage level is above the threshold coverage level, the second layer 405-*b* may transmit a second signal (e.g., signal 2) to the first layer 405-*a*.

At 445, the first layer 405-*a* may transition back to the paging response initiated state based on stopping criteria being met. For example, the stopping criteria may include expiration (e.g., timeout) of the paging response timer, receiving the second signal from the second layer 405-*b*, an indication from the upper layer of the UE 115 (e.g., if the user responds to the alert notification with a rejection), or any combination thereof.

At 450, the UE 115 may transition to a paging response initiated state. In some cases, the UE 115 may transition to the paging response initiated state based on stopping the paging response timer. In some cases, while the UE 115 is in the paging response initiated state, the UE 115 may respond to the pre-paging request, which may include performing service request procedures or service registration procedures (e.g., perform service to pre-paging request). The paging response initiated state described herein may thereby correspond to one or more operations at the UE 115 that support generation of a response to a paging request, and the paging response pending state described herein may correspond to one or more operations at the UE 115 that support delaying a response to the paging request.

Figure 5:
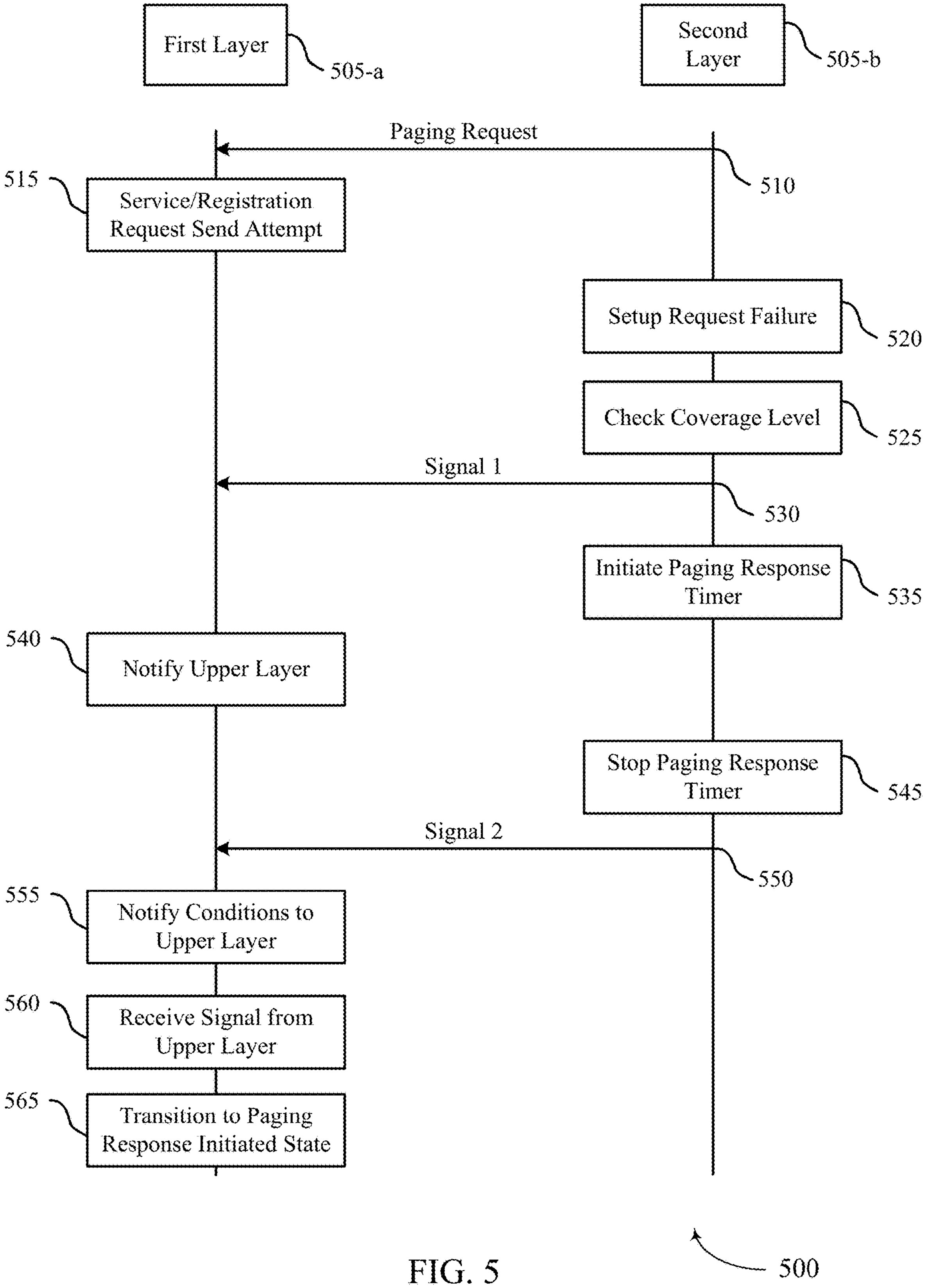

FIG. 5 shows an example of a process flow 500 that supports delayed service for paging requests in accordance with one or more aspects of the present disclosure. The process flow 500 includes a first layer 505-*a* and a second layer 505-*b*, which may be examples of the protocol stack layers of a UE 115 as described with respect to FIGS. 1 and 2. The first layer 505-*a* may be a NAS layer of a UE 115 and the second layer 505-*b* may be an RRC layer of the UE 115. Accordingly, the first layer 505-*a* and the second layer 505-*b* may be examples of corresponding layers described with reference to FIGS. 3 and 4. Although the first layer 505-*a* and the second layer 505-*b* may be shown to perform operations and signaling for simplicity and clarity, it should be interpreted that the UE 115 may perform the operations and signaling at each layer, or any other layer not illustrated. Further, transmitting and receiving signals and messages between the layers of the UE 115 may be understood as internally exchanging signals or messages between the layers of the UE 115.

In the following description of the process flow 500, the operations between the first layer 505-*a* and the second layer 505-*b* may be performed in a different order than the example order shown. Some operations may also be omitted from the process flow 500, and other operations may be added to the process flow 500. Further, although some operations or signaling may be shown to occur at different times for discussion purposes, these operations may actually occur at the same time. Further, each layer discussed with reference to FIG. 5 may include one or more individual layers. That is, one or more relatively lower layers may collectively perform functionalities ascribed herein to second layer 505-*b*, one or more relatively upper layers may collectively perform functionalities ascribed herein to an upper layer (e.g., as discussed at 540, 555, 560), or one or more in-between layers may collectively perform functionalities ascribed herein to first layer 505-*a*.

In some cases, before the UE 115 receives a paging message, the UE 115 may be in an idle state (e.g., 5GMM-IDLE), a registered normal service state (e.g., 5GMM-REGISTERED.NORMAL-SERVICE), or a non-allowed service state (e.g., 5GMM-REGISTERED.NON-ALLOWED-SERVICE). For example, the UE 115 may have previously registered with and established a connection with a network entity 105 and may operate in the idle state, while the UE 115 may be performing regular service operations with the network entity 105 and may operate in the registered normal service state. In some other cases, the UE 115 may be in an idle state (e.g., 5GMM-IDLE) or a registration attempt update state (e.g., 5GMM-REGISTERED.ATTEMPTING-REGISTRATION-UPDATE). In other words, the UE 115 may be actively attempting to perform a registration update by sending a request and may operate in the registration attempt update state.

At 510, the first layer 505-*a* may receive a paging request from the second layer 505-*b*. For example, the UE 115 may receive the paging message (e.g., the paging message described with reference to FIG. 2) or a pre-paging message at a physical layer of the UE 115, and the message may be forwarded to the first layer 305-*a*.

At 515, in some examples, the UE 115 may attempt to transmit a service request or a registration request at the first layer 505-*a*. The service request or the registration request may fail, in some examples.

At 520, in some examples, at the second layer 505-*b*, the UE 115 may attempt to send a setup request (e.g., an RRC setup request). In some cases, the setup request may fail or a setup request timer (e.g., timer T300) may expire. At 525, the second layer 505-*b* may check (e.g., measure) a coverage level (e.g., a signal coverage level) of the UE 115 compared to a coverage level threshold (e.g., the coverage level threshold may be similar to the threshold signal quality level described with reference to FIG. 2). In some cases, the second layer 505-*b* may determine that the coverage level is below the coverage level threshold. In some cases, the second layer 505-*b* may check the coverage level based on an establishment cause being a mobile originated call (e.g., based on the UE 115 initiating an outbound call).

At 530, the second layer 505-*b* may transmit a first signal (e.g., signal 1) to the first layer 505-*a*. The first signal may include an indication of an expected delay, a delay duration of the expected delay, or any combination thereof based on the failure of the random access procedure, the failure of the coverage level to satisfy the threshold, or both. In some cases, the first signal may include an estimate of time (e.g., the delay duration) after which the channel conditions (e.g., radio propagation conditions) may improve. The first signal may be based on the coverage level of the UE 115 being below the coverage level threshold. At 535, the second layer 505-*b* may initiate a paging response timer after transmitting the first signal. A default value of the paging response timer may be based on the estimate of time after which the channel conditions may improve.

Additionally, or alternatively, in some examples, if the UE 115 receives a pre-paging message, the second layer 505-*b* may forward an indication of the pre-paging message to the first layer 505-*a*, and the second layer 505-*b* may refrain from performing 520, 525, 530, and 535, as described in further detail with reference to FIG. 4.

At 540, the first layer 505-*a* may transmit an alert notification (e.g., signal A) to an upper layer of the UE 115 (e.g., a user interface of the UE 115). In some cases, transmitting the alert notification may be based on reception of the first signal at the first layer 505-*a* or may be based on an indication of a pre-paging signal received at the second layer 505-*b*. The alert notification may indicate that the coverage level of the UE 115 is below the coverage level threshold, that the UE 115 may delay a response to a paging message, or any combination thereof. In some cases, the alert notification may include an option for the user to accept or reject transmitting the paging response. For example, the user may determine to transmit a paging response immediately regardless of the reduced channel conditions, or the user may determine to refrain from transmitting a paging response, or the user may determine to transmit the paging response after the delay.

At 545, in some examples (e.g., if a paging message is received at the UE 115), the second layer 505-*b* may stop (e.g., cancel) the paging response timer if the coverage level of the UE 115 is above the threshold coverage level or if the paging response timer expires.

At 550, the second layer 505-*b* may transmit a second signal (e.g., signal 2) to the first layer 505-*a*. The second signal may include an indication that the paging response timer expired or that the coverage level of the UE 115 is above the threshold coverage level, or both. In some examples, the second layer 505-*b* may detect an improved radio propagation scenario at the UE 115, and the second layer 505-*b* may transmit the second signal to the first layer 505-*a* accordingly. In some cases, if the paging response timer expired at the first layer 505-*a*, the second layer 505-*b* may refrain from transmitting the second signal to the second layer 505-*b*. Additionally, or alternatively, in some examples, the second signal may instruct the first layer 505-*a* to stop the paging response timer based on the coverage level of the UE 115 satisfying the threshold coverage level.

At 555, the first layer 505-*a* may transmit an improved conditions notification to the upper layer of the UE 115 based on receiving the second signal. The improved conditions notification may indicate that conditions have improved, that the UE 115 may transmit the paging response, or any combination thereof.

At 560, the first layer 505-*a* may receive a third signal (e.g., signal B) from the upper layer of the UE 115. The upper layer may determine when to transmit signal B to the first layer 505-*a* based on user input or logic implemented at the upper layer. The UE 115 may behave, in response to receiving third signal, as if it received a paging request. For example, after receiving the third signal, the UE 115 may attempt to transmit a paging response using methods as described herein.

At 565, the UE 115 may transition to (e.g., enter) a paging response initiated state based on the third signal received from the upper layer. In some cases, while the UE 115 is in the paging response initiated state, the UE 115 may respond to the paging request, which may include performing service request procedures or service registration procedures (e.g., perform service to paging request). The paging response initiated state described herein may thereby correspond to one or more operations at the UE 115 that support generation of a response to a paging request, and the paging response pending state described herein may correspond to one or more operations at the UE 115 that support delaying a response to the paging request.

The upper layer may thereby determine when to perform service to a paging message, in some examples.

Figure 6:
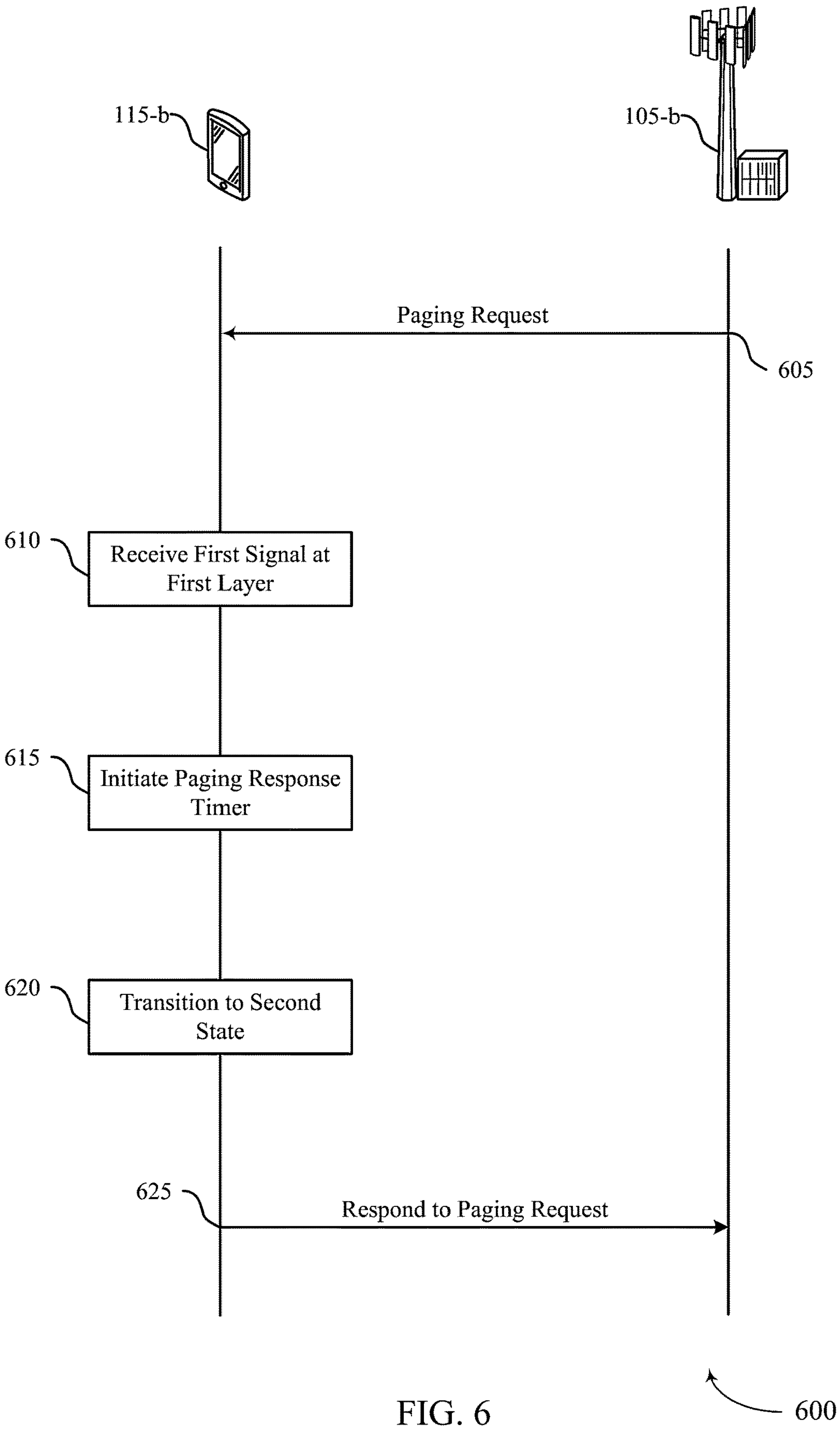

FIG. 6 shows an example of a process flow 600 that supports delayed service for paging requests in accordance with one or more aspects of the present disclosure. The process flow 600 includes a UE 115-*b* and a network entity 105-*b*, which may be examples of corresponding devices as described with respect to FIGS. 1 and 2. In the following description of the process flow 600, the operations between the UE 115-*b* and the network entity 105-*b* may be performed in a different order than the example order shown. Some operations may also be omitted from the process flow 600, and other operations may be added to the process flow 600. Further, although some operations or signaling may be shown to occur at different times for discussion purposes, these operations may actually occur at the same time.

At 605, the UE 115-*b* may receive, at a first layer of the UE 115-*b*, an indication of a paging request. In some cases, the UE 115-*b* may operate in a state associated with initiation of a paging response based on receipt of the paging request. The state associated with initiation of the paging response may be an example of a second state, or the paging response initiated state described with reference to FIGS. 2-5. While operating in the second state, the UE 115-*b* may ignore or buffer further service requests. In some cases, the UE 115-*b* may monitor, at the first layer of the UE 115-*b*, for a first signal while operating in the second state.

At 610, the UE 115-*b* may receive, at the first layer of the UE 115-*b* and from a second layer of the UE 115-*b*, a first signal. The first signal may indicate a delay associated with the paging response to the paging request for the UE 115-*b*. The UE 115-*b* may transition from the second state to the first state based on the first signal indicating the delay. In some cases, the UE 115-*b* may initiate the paging response timer based on the first signal, based on transitioning to the first state, or both. The first signal may be based on a failure of a random-access procedure by the UE 115-*b*, a failure of a signal coverage level for the UE 115-*b* to satisfy a threshold signal coverage level, or both. Receiving the first signal may include receiving a pre-paging signal that indicates the paging request and the delay associated with the paging response, or receiving an indication that a paging message was received at the UE 115-*b*. That is, the first signal may represent an example of the Signal 1, the pre-paging message, or both, as described with reference to FIGS. 3-5.

At 615, the UE 115-*b* may initiate a paging response timer based on the first signal indicating the delay. The paging response timer may be associated with the pending paging response and with a reset of one or more operation parameters of the UE. The reset of the one or more operation parameters may support the delay associated with the paging response. In some cases, the UE 115-*b* may transmit, from the first layer of the UE 115-*b* and to an upper layer of the UE 115-*b*, a notification that indicates receipt of the first signal at the first layer of the UE 115-*b*. In such cases, the UE 115-*b* may output, from the upper layer of the UE 115-*b* and based on the notification, an alert indicating that the paging response is delayed for a time period or until channel conditions at the UE 115-*b* satisfy a threshold.

At 620, after the delay, the UE 115-*b* may transition to the second state associated with initiation of the paging response based on satisfaction of one or more paging response conditions. The paging response conditions may include expiration of the paging response timer, a coverage level of the UE 115-*b* satisfying a threshold coverage level, or both.

At 625, the UE 115-*b* may respond to the paging request after transitioning to the second state.

Figure 7:
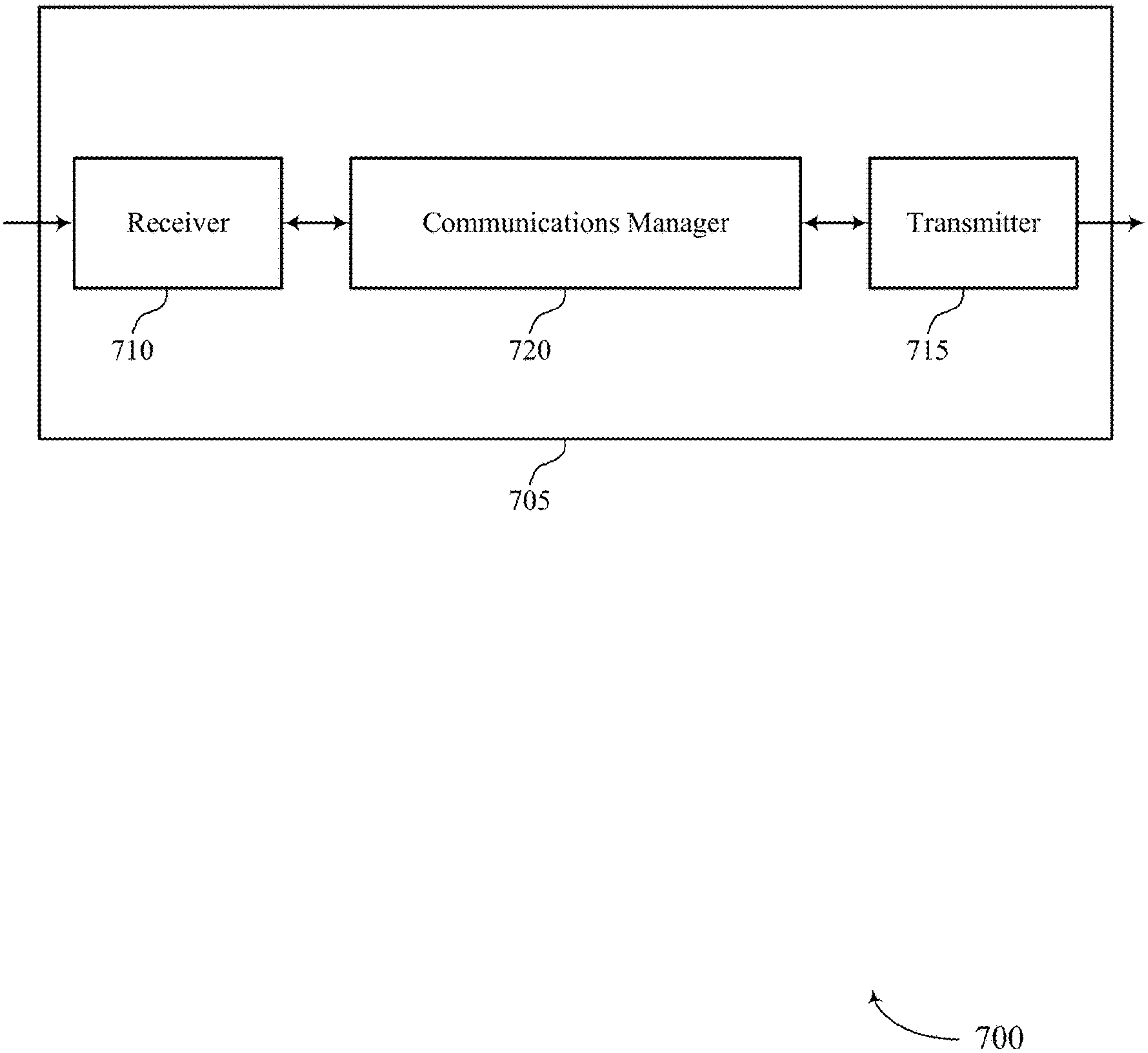
FIGS. 7 and 8 show block diagrams of devices that support delayed service for paging requests in accordance with one or more aspects of the present disclosure.

FIG. 7 shows a block diagram 700 of a device 705 that supports delayed service for paging requests in accordance with one or more aspects of the present disclosure. The device 705 may be an example of aspects of a UE 115 as described herein. The device 705 may include a receiver 710, a transmitter 715, and a communications manager 720. In some cases, receiving, transmitting, or both may be interpreted to mean receiving and/or transmitting signals over-the-air, or exchanging signals between layers within the device 705, or both. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to delayed service for paging requests). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to delayed service for paging requests). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of delayed service for paging requests as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving, at a first layer of the UE, an indication of a paging request. The communications manager 720 is capable of, configured to, or operable to support a means for receiving, at the first layer of the UE and from a second layer of the UE, a first signal indicating a delay associated with a paging response to the paging request for the UE. The communications manager 720 is capable of, configured to, or operable to support a means for initiating a paging response timer based on the first signal indicating the delay, where the paging response timer is associated with a pending paging response and with a reset of one or more operation parameters of the UE. The communications manager 720 is capable of, configured to, or operable to support a means for transitioning, after the delay, to a state associated with initiation of the paging response based on satisfaction of one or more paging response conditions, where the state associated with initiation of the paging response is a state in which further service requests are ignored or buffered. The communications manager 720 is capable of, configured to, or operable to support a means for responding to a paging request after transitioning to the state associated with initiation of the paging response.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for delayed service for paging requests, which may result in improved communication reliability, more efficient utilization of communication resources, improved coordination between devices, improved utilization of processing capability, among other advantages. Techniques described herein may provide for improved throughput for paging messages by enabling a processor at a UE (e.g., a smartphone) to transition from an insufficient link budget scenario to a sufficient link budget scenario.

Figure 8:
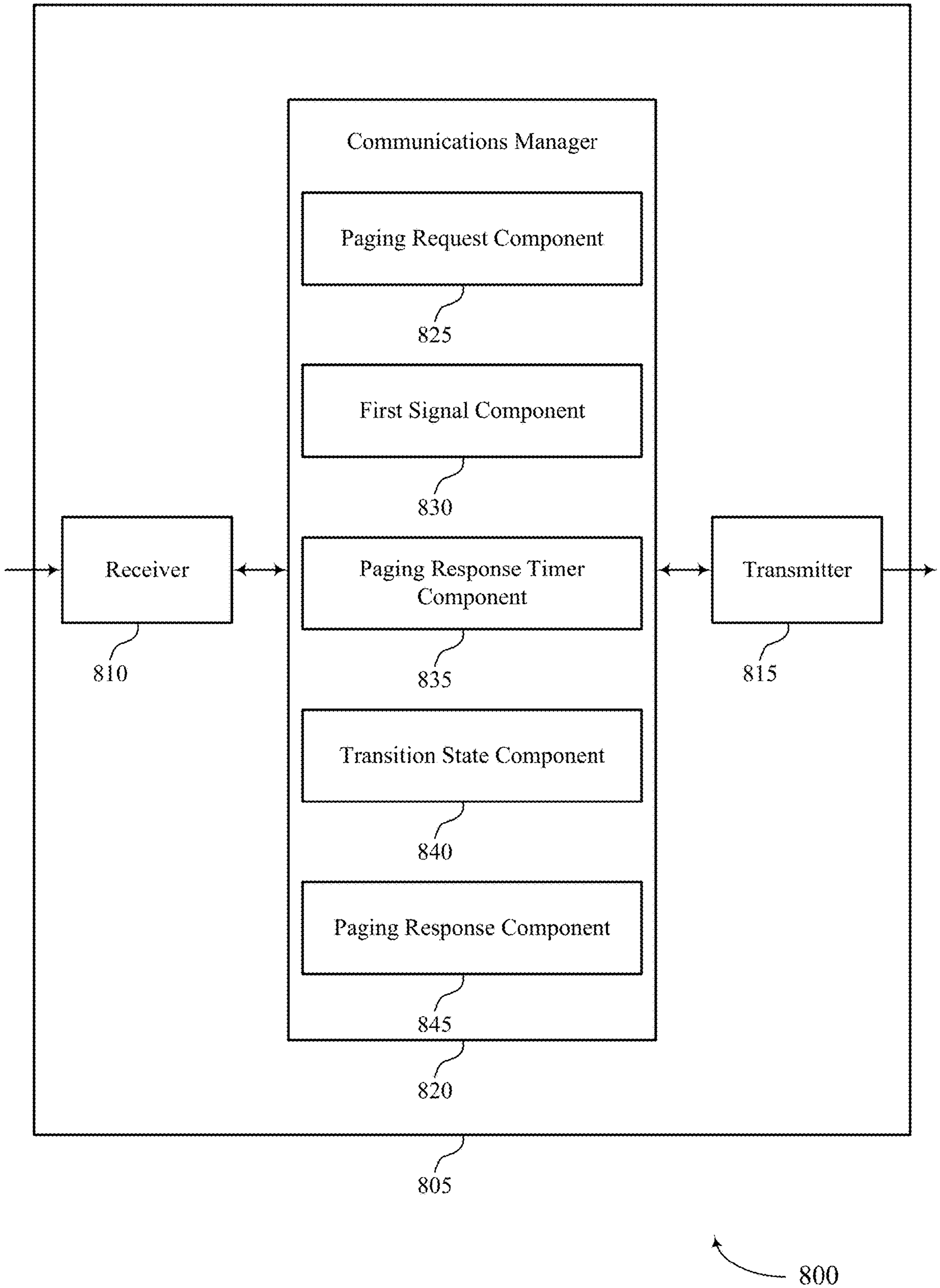

FIG. 8 shows a block diagram 800 of a device 805 that supports delayed service for paging requests in accordance with one or more aspects of the present disclosure. The device 805 may be an example of aspects of a device 705 or a UE 115 as described herein. The device 805 may include a receiver 810, a transmitter 815, and a communications manager 820. In some cases, receiving, transmitting, or both may be interpreted to mean exchanging signals between layers within the device 805. The device 805, or one of more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to delayed service for paging requests). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to delayed service for paging requests). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of delayed service for paging requests as described herein. For example, the communications manager 820 may include a paging request component 825, a first signal component 830, a paging response timer component 835, a transition state component 840, a paging response component 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The paging request component 825 is capable of, configured to, or operable to support a means for receiving, at a first layer of the UE, an indication of a paging request. The first signal component 830 is capable of, configured to, or operable to support a means for receiving, at the first layer of the UE and from a second layer of the UE, a first signal indicating a delay associated with a paging response to the paging request for the UE. The paging response timer component 835 is capable of, configured to, or operable to support a means for initiating a paging response timer based on the first signal indicating the delay, where the paging response timer is associated with a pending paging response and with a reset of one or more operation parameters of the UE. The transition state component 840 is capable of, configured to, or operable to support a means for transitioning, after the delay, to a state associated with initiation of the paging response based on satisfaction of one or more paging response conditions, where the state associated with initiation of the paging response is a state in which further service requests are ignored or buffered. The paging response component 845 is capable of, configured to, or operable to support a means for responding to a paging request after transitioning to the state associated with initiation of the paging response.

Figure 9:
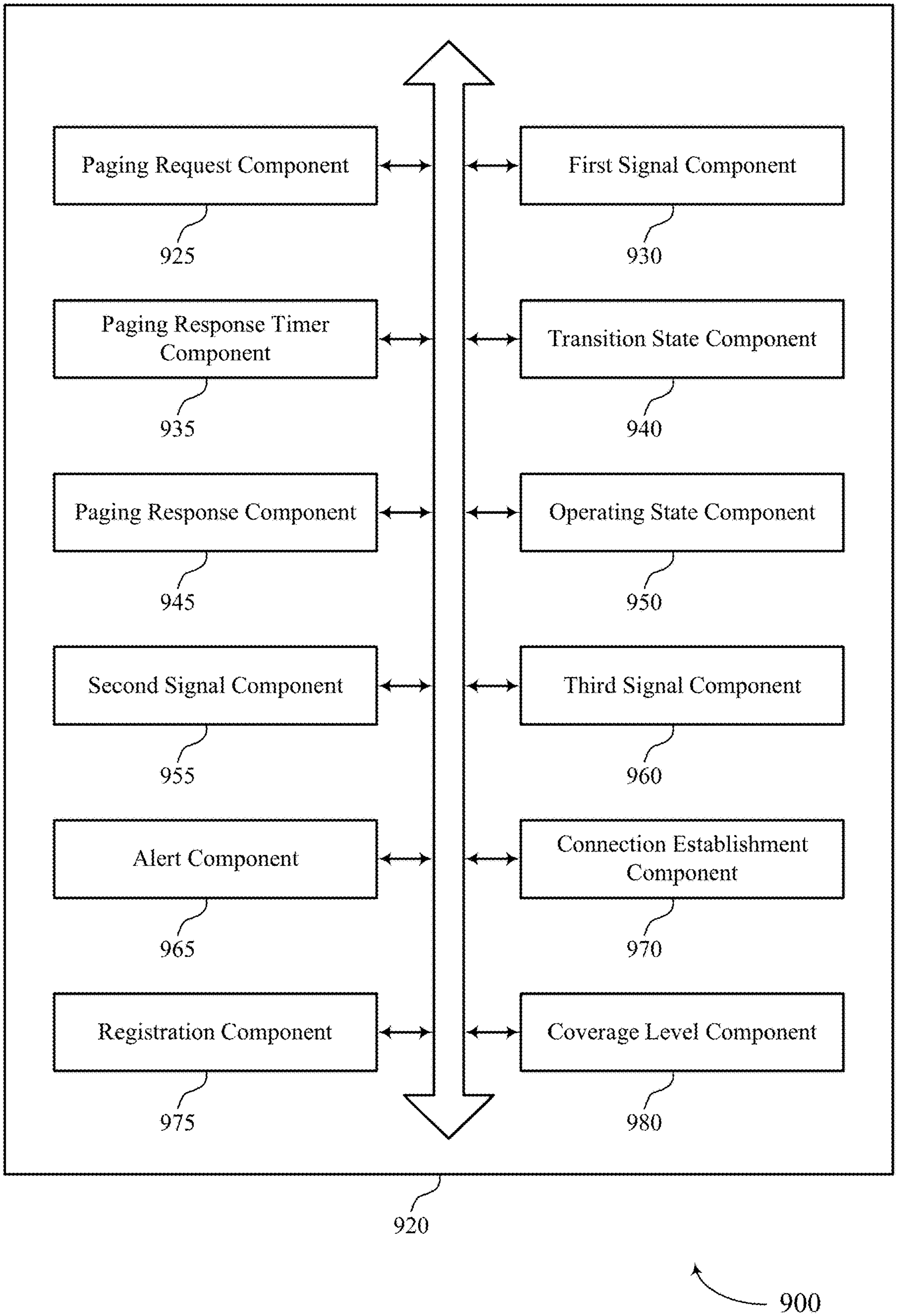
FIG. 9 shows a block diagram of a communications manager that supports delayed service for paging requests in accordance with one or more aspects of the present disclosure.

FIG. 9 shows a block diagram 900 of a communications manager 920 that supports delayed service for paging requests in accordance with one or more aspects of the present disclosure. The communications manager 920 may be an example of aspects of a communications manager 720, a communications manager 820, or both, as described herein. The communications manager 920, or various components thereof, may be an example of means for performing various aspects of delayed service for paging requests as described herein. For example, the communications manager 920 may include a paging request component 925, a first signal component 930, a paging response timer component 935, a transition state component 940, a paging response component 945, an operating state component 950, a second signal component 955, a third signal component 960, an alert component 965, a connection establishment component 970, a registration component 975, a coverage level component 980, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The paging request component 925 is capable of, configured to, or operable to support a means for receiving, at a first layer of the UE, an indication of a paging request. The first signal component 930 is capable of, configured to, or operable to support a means for receiving, at the first layer of the UE and from a second layer of the UE, a first signal indicating a delay associated with a paging response to the paging request for the UE. The paging response timer component 935 is capable of, configured to, or operable to support a means for initiating a paging response timer based on the first signal indicating the delay, where the paging response timer is associated with a pending paging response and with a reset of one or more operation parameters of the UE. The transition state component 940 is capable of, configured to, or operable to support a means for transitioning, after the delay, to a state associated with initiation of the paging response based on satisfaction of one or more paging response conditions, where the state associated with initiation of the paging response is a state in which further service requests are ignored or buffered. The paging response component 945 is capable of, configured to, or operable to support a means for responding to a paging request after transitioning to the state associated with initiation of the paging response.

In some examples, the operating state component 950 is capable of, configured to, or operable to support a means for operating in a first state associated with the paging response timer and associated with a pending paging response, where the state associated with initiation of the paging response includes a second state.

In some examples, the paging request component 925 is capable of, configured to, or operable to support a means for receiving the paging request. In some examples, the operating state component 950 is capable of, configured to, or operable to support a means for operating in the second state based on receipt of the paging request. In some examples, the first signal component 930 is capable of, configured to, or operable to support a means for monitoring, at the first layer of the UE, for the first signal while operating in the second state. In some examples, the transition state component 940 is capable of, configured to, or operable to support a means for transitioning from the second state to the first state based on the first signal indicating the delay, where initiating the paging response timer is based on transitioning to the first state.

In some examples, the operating state component 950 is capable of, configured to, or operable to support a means for receiving a signal indicating an activation of a delayed paging response procedure for the UE, where operation in the first state is further based on the activation of the delayed paging response procedure.

In some examples, the first signal is based on a failure of a random-access procedure by the UE, a failure of a signal coverage level for the UE to satisfy a threshold signal coverage level, or both.

In some examples, to support receiving the first signal at the first layer of the UE, the first signal component 930 is capable of, configured to, or operable to support a means for receiving, at the first layer of the UE and from the second layer of the UE, a pre-paging signal, where the pre-paging signal indicates the paging request and the delay associated with the paging response.

In some examples, the satisfaction of the one or more paging response conditions includes an expiration of the paging response timer, the paging response timer associated with a first state.

In some examples, the second signal component 955 is capable of, configured to, or operable to support a means for receiving, at the first layer of the UE and from the second layer of the UE, a second signal that indicates the satisfaction of the one or more paging response conditions, where the one or more paging response conditions include a coverage level of the UE satisfying a threshold coverage level, an expiration of the paging response timer, or both, and where the UE transitions to the state associated with the initiation of the paging response based on the second signal.

In some examples, the third signal component 960 is capable of, configured to, or operable to support a means for receiving, at the first layer of the UE and from an upper layer of the UE, a third signal that indicates the paging request, where the satisfaction of the one or more paging response conditions is based on the third signal.

In some examples, the coverage level component 980 is capable of, configured to, or operable to support a means for receiving, at the first layer of the UE and from the second layer of the UE, a second signal that indicates that a signal coverage level of the UE satisfies a threshold signal coverage level. In some examples, the third signal component 960 is capable of, configured to, or operable to support a means for forwarding, from the first layer of the UE and to the upper layer of the UE, the second signal, where the third signal from the upper layer is based on the second signal.

In some examples, the first signal component 930 is capable of, configured to, or operable to support a means for transmitting, from the first layer of the UE and to an upper layer of the UE, a notification that indicates receipt of the first signal at the first layer of the UE. In some examples, the alert component 965 is capable of, configured to, or operable to support a means for outputting, from the upper layer of the UE based on the notification, an alert indicating that the paging response is delayed for a time period or until channel conditions at the UE satisfy a threshold.

In some examples, the transition state component 940 is capable of, configured to, or operable to support a means for transmitting a registration request, a serving request, or both based on the transition to the state associated with the initiation of the paging response.

In some examples, the connection establishment component 970 is capable of, configured to, or operable to support a means for establishing, before receipt of the first signal, a connection between the UE and a network, where, based on establishment of the connection between the UE and the network, the one or more operation parameters of the UE that are reset in accordance with the paging response timer include one or more serving request states, one or more timers, or any combination thereof.

In some examples, the registration component 975 is capable of, configured to, or operable to support a means for initiating a registration attempt with a network, where the first signal is received before completion of the registration attempt, and where, based on receipt of the first signal before the completion of the registration attempt, the one or more operation parameters of the UE that are reset in accordance with the paging response timer include a registration request, one or more timers, or any combination thereof.

In some examples, the first layer of the UE includes a non-access stratum layer and the second layer of the UE includes a radio resource control layer.

Figure 10:
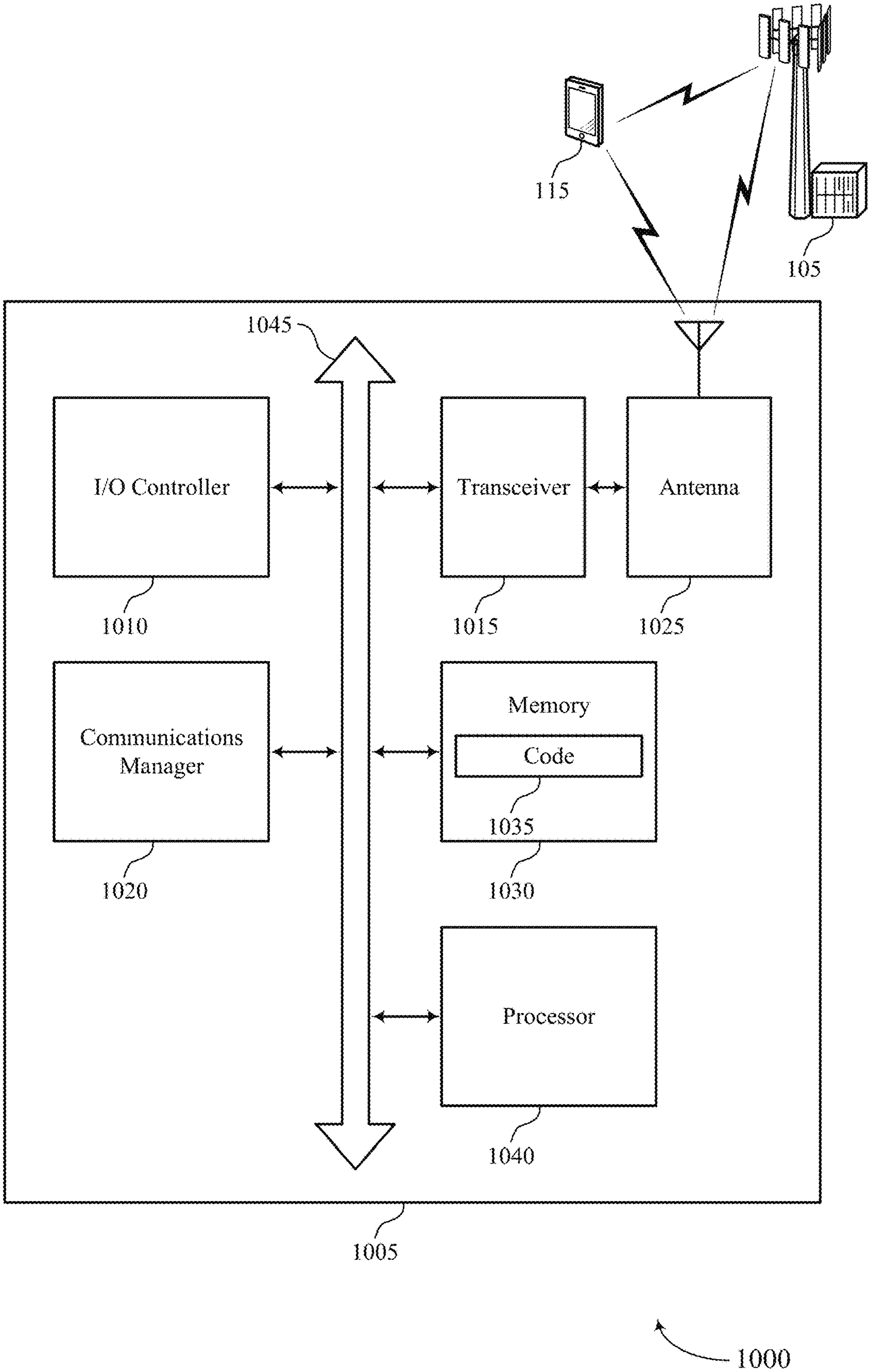
FIG. 10 shows a diagram of a system including a device that supports delayed service for paging requests in accordance with one or more aspects of the present disclosure.

FIG. 10 shows a diagram of a system 1000 including a device 1005 that supports delayed service for paging requests in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein. In some cases, receiving, transmitting, or both may be interpreted to mean receiving and/or transmitting signals over-the-air, or exchanging signals between layers within the device 1005, or both.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting delayed service for paging requests). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for receiving, at a first layer of the UE, an indication of a paging request. The communications manager 1020 is capable of, configured to, or operable to support a means for receiving, at the first layer of the UE and from a second layer of the UE, a first signal indicating a delay associated with a paging response to the paging request for the UE. The communications manager 1020 is capable of, configured to, or operable to support a means for initiating a paging response timer based on the first signal indicating the delay, where the paging response timer is associated with a pending paging response and with a reset of one or more operation parameters of the UE. The communications manager 1020 is capable of, configured to, or operable to support a means for transitioning, after the delay, to a state associated with initiation of the paging response based on satisfaction of one or more paging response conditions, where the state associated with initiation of the paging response is a state in which further service requests are ignored or buffered. The communications manager 1020 is capable of, configured to, or operable to support a means for responding to a paging request after transitioning to the state associated with initiation of the paging response.

By including or configuring the communications manager 1020 in accordance with examples as described herein, the device 1005 may support techniques for delayed service for paging requests, which may result in improved communication reliability, more efficient utilization of communication resources, improved coordination between devices, improved utilization of processing capability, among other advantages. Techniques described herein may provide for improved throughput for paging messages by enabling a UE (e.g., a smartphone) to transition from an insufficient link budget scenario to a sufficient link budget scenario. Further, the techniques described herein may enable the UE to receive paging messages that indicate important information to a user (e.g., emergency paging messages).

In some examples, the communications manager 1020 may be configured to perform various operations (e.g., receiving, monitoring, transmitting) using or otherwise in cooperation with the transceiver 1015, the one or more antennas 1025, or any combination thereof. For example, the communications manager 1020 may be configured to perform various operations (e.g., receiving, monitoring, transmitting), using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of delayed service for paging requests as described herein, or the at least one processor 1040 and the at least one memory 1030 may be otherwise configured to, individually or collectively, perform or support such operations.

Figure 11:
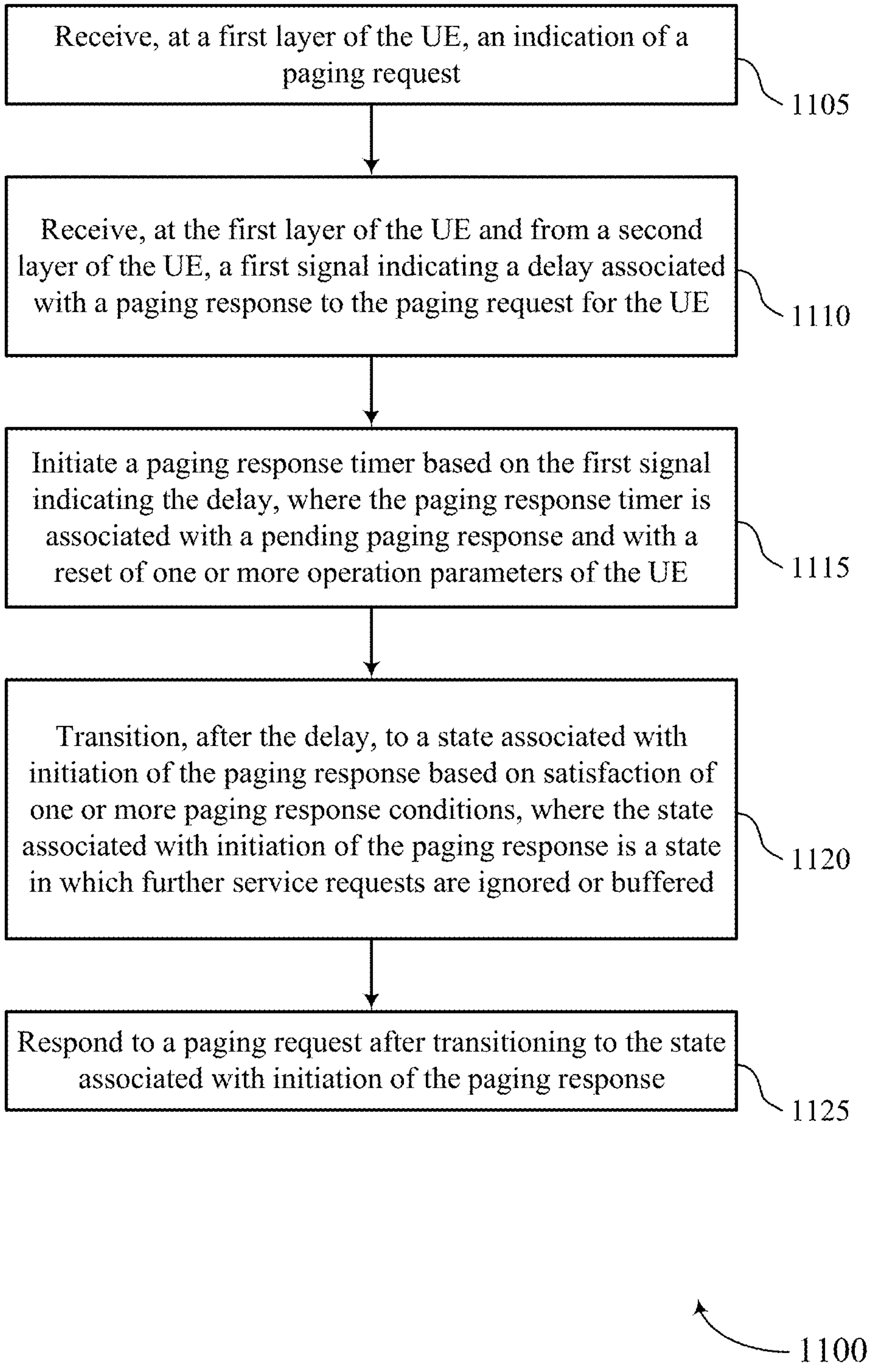
FIGS. 11 through 14 show flowcharts illustrating methods that support delayed service for paging requests in accordance with one or more aspects of the present disclosure.

FIG. 11 shows a flowchart illustrating a method 1100 that supports delayed service for paging requests in accordance with aspects of the present disclosure. The operations of the method 1100 may be implemented by a UE or its components as described herein. For example, the operations of the method 1100 may be performed by a UE 115 as described with reference to FIGS. 1 through 10. In some cases, at the UE 115, receiving, transmitting, or both may be interpreted to mean exchanging signals between layers within the UE 115. In some examples, a UE may execute a set of instructions to control the functional elements of the UE to perform the described functions. Additionally, or alternatively, the UE may perform aspects of the described functions using special-purpose hardware.

At 1105, the method may include receiving, at a first layer of the UE, an indication of a paging request. The operations of block 1105 may be performed in accordance with examples as disclosed herein. In some examples, aspects of the operations of 1105 may be performed by a paging request component 925 as described with reference to FIG. 9. Additionally, or alternatively, means for performing 1105 may, but not necessarily, include, for example, antenna 1025, transceiver 1015, communications manager 1020, memory 1030 (including code 1035), processor 1040 and/or bus 1045.

At 1110, the method may include receiving, at the first layer of the UE and from a second layer of the UE, a first signal indicating a delay associated with a paging response to the paging request for the UE. The operations of block 1110 may be performed in accordance with examples as disclosed herein. In some examples, aspects of the operations of 1110 may be performed by a first signal component 930 as described with reference to FIG. 9. Additionally, or alternatively, means for performing 1110 may, but not necessarily, include, for example, antenna 1025, transceiver 1015, communications manager 1020, memory 1030 (including code 1035), processor 1040 and/or bus 1045.

At 1115, the method may include initiating a paging response timer based on the first signal indicating the delay, where the paging response timer is associated with a pending paging response and with a reset of one or more operation parameters of the UE. The operations of block 1115 may be performed in accordance with examples as disclosed herein. In some examples, aspects of the operations of 1115 may be performed by a paging response timer component 935 as described with reference to FIG. 9. Additionally, or alternatively, means for performing 1115 may, but not necessarily, include, for example, antenna 1025, transceiver 1015, communications manager 1020, memory 1030 (including code 1035), processor 1040 and/or bus 1045.

At 1120, the method may include transitioning, after the delay, to a state associated with initiation of the paging response based on satisfaction of one or more paging response conditions, where the state associated with initiation of the paging response is a state in which further service requests are ignored or buffered. The operations of block 1120 may be performed in accordance with examples as disclosed herein. In some examples, aspects of the operations of 1120 may be performed by a transition state component 940 as described with reference to FIG. 9. Additionally, or alternatively, means for performing 1120 may, but not necessarily, include, for example, antenna 1025, transceiver 1015, communications manager 1020, memory 1030 (including code 1035), processor 1040 and/or bus 1045.

At 1125, the method may include responding to a paging request after transitioning to the state associated with initiation of the paging response. The operations of block 1125 may be performed in accordance with examples as disclosed herein. In some examples, aspects of the operations of 1125 may be performed by a paging response component 945 as described with reference to FIG. 9. Additionally, or alternatively, means for performing 1125 may, but not necessarily, include, for example, antenna 1025, transceiver 1015, communications manager 1020, memory 1030 (including code 1035), processor 1040 and/or bus 1045.

Figure 12:
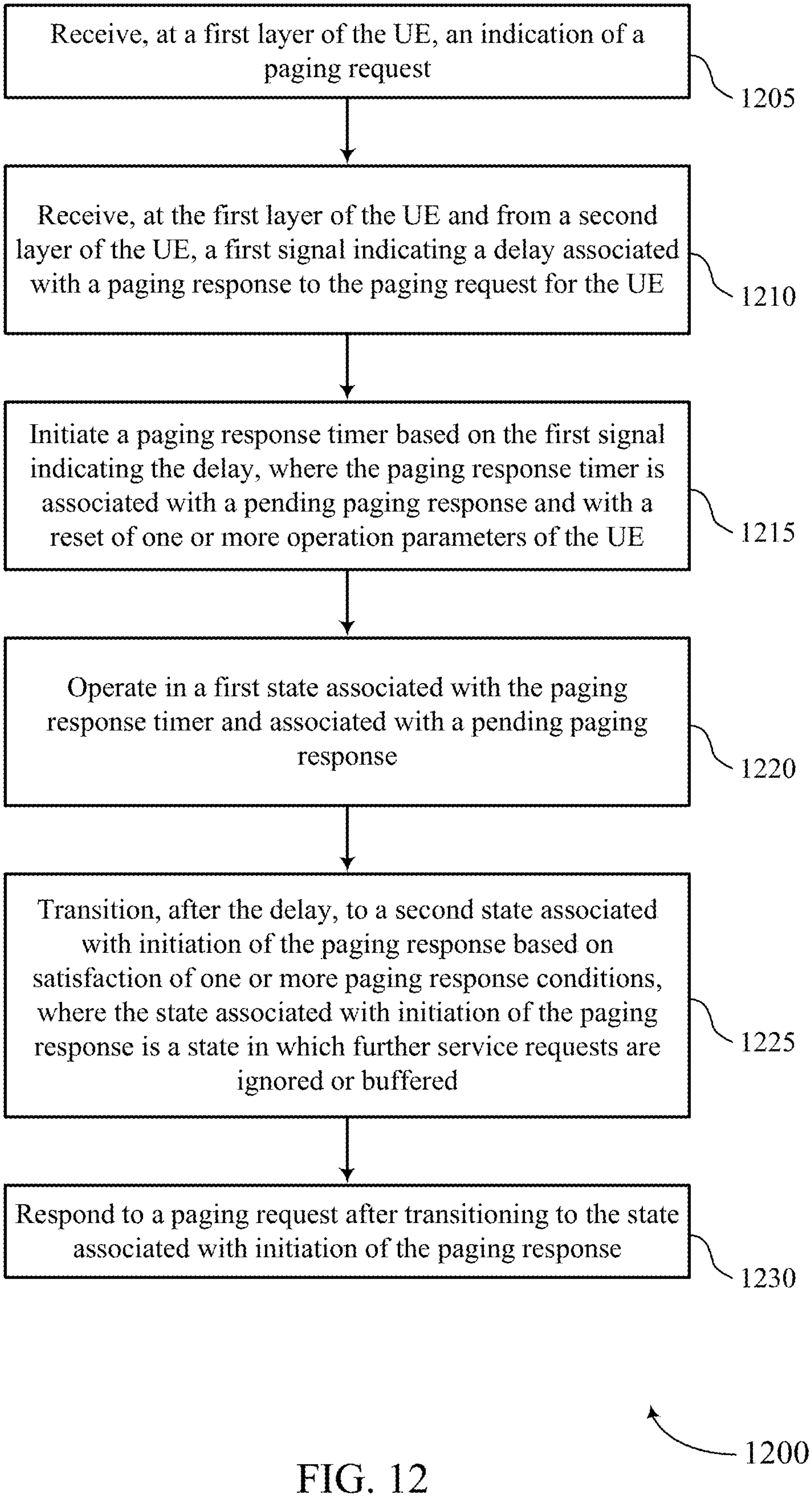

FIG. 12 shows a flowchart illustrating a method 1200 that supports delayed service for paging requests in accordance with aspects of the present disclosure. The operations of the method 1200 may be implemented by a UE or its components as described herein. For example, the operations of the method 1200 may be performed by a UE 115 as described with reference to FIGS. 1 through 10. In some cases, at the UE 115, receiving, transmitting, or both may be interpreted to mean exchanging signals between layers within the UE 115. In some examples, a UE may execute a set of instructions to control the functional elements of the UE to perform the described functions. Additionally, or alternatively, the UE may perform aspects of the described functions using special-purpose hardware.

At 1205, the method may include receiving, at a first layer of the UE, an indication of a paging request. The operations of block 1205 may be performed in accordance with examples as disclosed herein. In some examples, aspects of the operations of 1205 may be performed by a paging request component 925 as described with reference to FIG. 9. Additionally, or alternatively, means for performing 1205 may, but not necessarily, include, for example, antenna 1025, transceiver 1015, communications manager 1020, memory 1030 (including code 1035), processor 1040 and/or bus 1045.

At 1210, the method may include receiving, at the first layer of the UE and from a second layer of the UE, a first signal indicating a delay associated with a paging response to the paging request for the UE. The operations of block 1210 may be performed in accordance with examples as disclosed herein. In some examples, aspects of the operations of 1210 may be performed by a first signal component 930 as described with reference to FIG. 9. Additionally, or alternatively, means for performing 1210 may, but not necessarily, include, for example, antenna 1025, transceiver 1015, communications manager 1020, memory 1030 (including code 1035), processor 1040 and/or bus 1045.

At 1215, the method may include initiating a paging response timer based on the first signal indicating the delay, where the paging response timer is associated with a pending paging response and with a reset of one or more operation parameters of the UE. The operations of block 1215 may be performed in accordance with examples as disclosed herein. In some examples, aspects of the operations of 1215 may be performed by a paging response timer component 935 as described with reference to FIG. 9. Additionally, or alternatively, means for performing 1215 may, but not necessarily, include, for example, antenna 1025, transceiver 1015, communications manager 1020, memory 1030 (including code 1035), processor 1040 and/or bus 1045.

At 1220, the method may include operating in a first state associated with the paging response timer and associated with a pending paging response. The operations of block 1220 may be performed in accordance with examples as disclosed herein. In some examples, aspects of the operations of 1220 may be performed by an operating state component 950 as described with reference to FIG. 9. Additionally, or alternatively, means for performing 1220 may, but not necessarily, include, for example, antenna 1025, transceiver 1015, communications manager 1020, memory 1030 (including code 1035), processor 1040 and/or bus 1045.

At 1225, the method may include transitioning, after the delay, to a second state associated with initiation of the paging response based on satisfaction of one or more paging response conditions, where the second state associated with initiation of the paging response is a state in which further service requests are ignored or buffered. The operations of block 1225 may be performed in accordance with examples as disclosed herein. In some examples, aspects of the operations of 1225 may be performed by a transition state component 940 as described with reference to FIG. 9. Additionally, or alternatively, means for performing 1225 may, but not necessarily, include, for example, antenna 1025, transceiver 1015, communications manager 1020, memory 1030 (including code 1035), processor 1040 and/or bus 1045.

At 1230, the method may include responding to a paging request after transitioning to the state associated with initiation of the paging response. The operations of block 1230 may be performed in accordance with examples as disclosed herein. In some examples, aspects of the operations of 1230 may be performed by a paging response component 945 as described with reference to FIG. 9. Additionally, or alternatively, means for performing 1230 may, but not necessarily, include, for example, antenna 1025, transceiver 1015, communications manager 1020, memory 1030 (including code 1035), processor 1040 and/or bus 1045.

Figure 13:
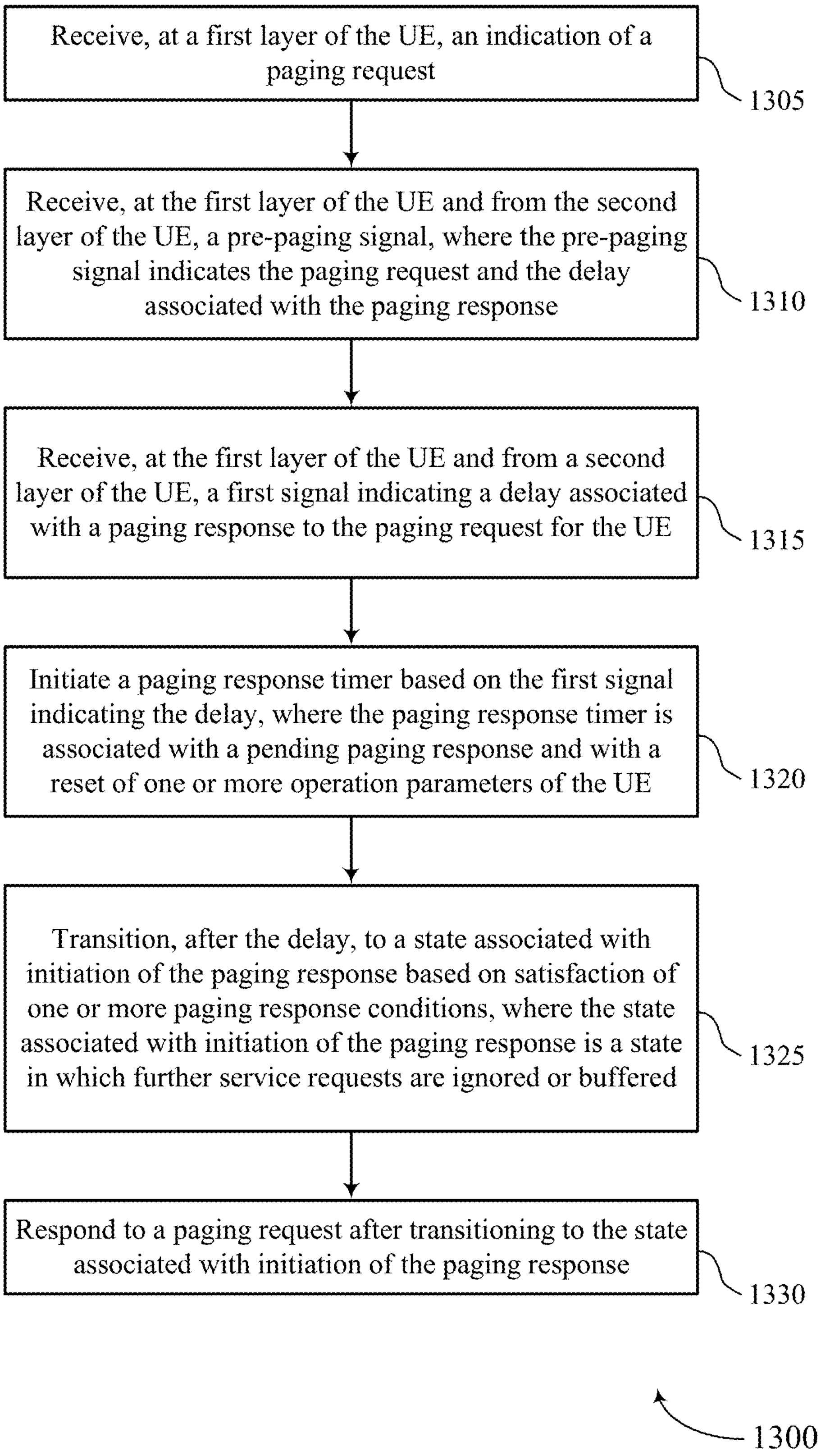

FIG. 13 shows a flowchart illustrating a method 1300 that supports delayed service for paging requests in accordance with aspects of the present disclosure. The operations of the method 1300 may be implemented by a UE or its components as described herein. For example, the operations of the method 1300 may be performed by a UE 115 as described with reference to FIGS. 1 through 10. In some cases, at the UE 115, receiving, transmitting, or both may be interpreted to mean exchanging signals between layers within the UE 115. In some examples, a UE may execute a set of instructions to control the functional elements of the UE to perform the described functions. Additionally, or alternatively, the UE may perform aspects of the described functions using special-purpose hardware.

At 1305, the method may include receiving, at a first layer of the UE, an indication of a paging request. The operations of block 1305 may be performed in accordance with examples as disclosed herein. In some examples, aspects of the operations of 1305 may be performed by a paging request component 925 as described with reference to FIG. 9. Additionally, or alternatively, means for performing 1305 may, but not necessarily, include, for example, antenna 1025, transceiver 1015, communications manager 1020, memory 1030 (including code 1035), processor 1040 and/or bus 1045.

At 1310, the method may include receiving, at the first layer of the UE and from the second layer of the UE, a pre-paging signal, where the pre-paging signal indicates the paging request and the delay associated with the paging response. The operations of block 1310 may be performed in accordance with examples as disclosed herein. In some examples, aspects of the operations of 1310 may be performed by a first signal component 930 as described with reference to FIG. 9. Additionally, or alternatively, means for performing 1310 may, but not necessarily, include, for example, antenna 1025, transceiver 1015, communications manager 1020, memory 1030 (including code 1035), processor 1040 and/or bus 1045.

At 1315, the method may include receiving, at the first layer of the UE and from a second layer of the UE, a first signal indicating a delay associated with a paging response to the paging request for the UE. The operations of block 1315 may be performed in accordance with examples as disclosed herein. In some examples, aspects of the operations of 1315 may be performed by a first signal component 930 as described with reference to FIG. 9. Additionally, or alternatively, means for performing 1315 may, but not necessarily, include, for example, antenna 1025, transceiver 1015, communications manager 1020, memory 1030 (including code 1035), processor 1040 and/or bus 1045.

At 1320, the method may include initiating a paging response timer based on the first signal indicating the delay, where the paging response timer is associated with a pending paging response and with a reset of one or more operation parameters of the UE. The operations of block 1320 may be performed in accordance with examples as disclosed herein. In some examples, aspects of the operations of 1320 may be performed by a paging response timer component 935 as described with reference to FIG. 9. Additionally, or alternatively, means for performing 1320 may, but not necessarily, include, for example, antenna 1025, transceiver 1015, communications manager 1020, memory 1030 (including code 1035), processor 1040 and/or bus 1045.

At 1325, the method may include transition, after the delay, to a state associated with initiation of the paging response based on satisfaction of one or more paging response conditions, where the state associated with initiation of the paging response is a state in which further service requests are ignored or buffered. The operations of block 1325 may be performed in accordance with examples as disclosed herein. In some examples, aspects of the operations of 1325 may be performed by a transition state component 940 as described with reference to FIG. 9. Additionally, or alternatively, means for performing 1325 may, but not necessarily, include, for example, antenna 1025, transceiver 1015, communications manager 1020, memory 1030 (including code 1035), processor 1040 and/or bus 1045.

At 1330, the method may include responding to a paging request after transitioning to the state associated with initiation of the paging response. The operations of block 1330 may be performed in accordance with examples as disclosed herein. In some examples, aspects of the operations of 1330 may be performed by a paging response component 945 as described with reference to FIG. 9. Additionally, or alternatively, means for performing 1330 may, but not necessarily, include, for example, antenna 1025, transceiver 1015, communications manager 1020, memory 1030 (including code 1035), processor 1040 and/or bus 1045.

Figure 14:
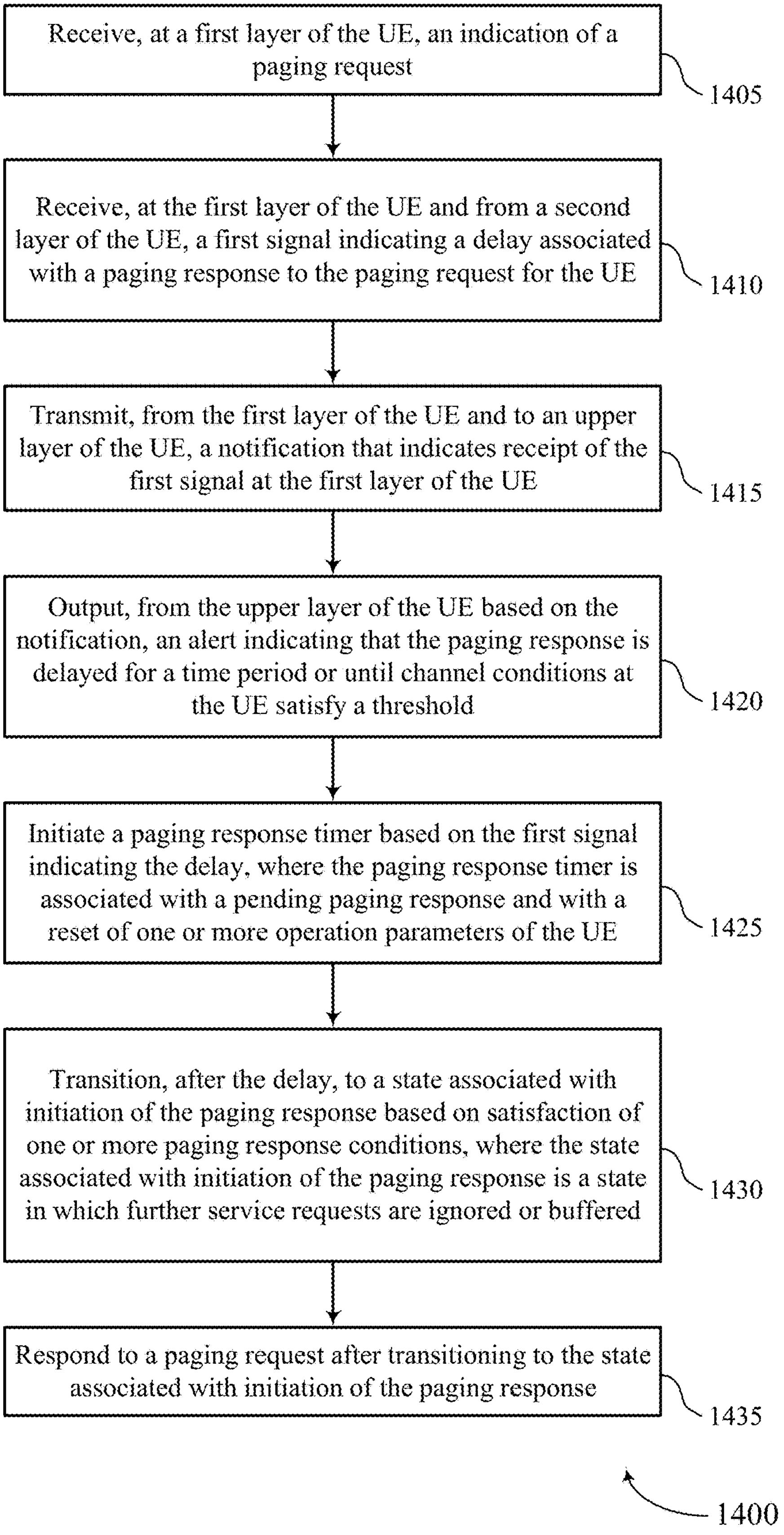

FIG. 14 shows a flowchart illustrating a method 1400 that supports delayed service for paging requests in accordance with aspects of the present disclosure. The operations of the method 1400 may be implemented by a UE or its components as described herein. For example, the operations of the method 1400 may be performed by a UE 115 as described with reference to FIGS. 1 through 10. In some cases, at the UE 115, receiving, transmitting, or both may be interpreted to mean exchanging signals between layers within the UE 115. In some examples, a UE may execute a set of instructions to control the functional elements of the UE to perform the described functions. Additionally, or alternatively, the UE may perform aspects of the described functions using special-purpose hardware.

At 1405, the method may include receiving, at a first layer of the UE, an indication of a paging request. The operations of block 1405 may be performed in accordance with examples as disclosed herein. In some examples, aspects of the operations of 1405 may be performed by a paging request component 925 as described with reference to FIG. 9. Additionally, or alternatively, means for performing 1405 may, but not necessarily, include, for example, antenna 1025, transceiver 1015, communications manager 1020, memory 1030 (including code 1035), processor 1040 and/or bus 1045.

At 1410, the method may include receiving, at the first layer of the UE and from a second layer of the UE, a first signal indicating a delay associated with a paging response to the paging request for the UE. The operations of block 1410 may be performed in accordance with examples as disclosed herein. In some examples, aspects of the operations of 1410 may be performed by a first signal component 930 as described with reference to FIG. 9. Additionally, or alternatively, means for performing 1410 may, but not necessarily, include, for example, antenna 1025, transceiver 1015, communications manager 1020, memory 1030 (including code 1035), processor 1040 and/or bus 1045.

At 1415, the method may include transmitting, from the first layer of the UE and to an upper layer of the UE, a notification that indicates receipt of the first signal at the first layer of the UE. The operations of block 1415 may be performed in accordance with examples as disclosed herein. In some examples, aspects of the operations of 1415 may be performed by a first signal component 930 as described with reference to FIG. 9. Additionally, or alternatively, means for performing 1415 may, but not necessarily, include, for example, antenna 1025, transceiver 1015, communications manager 1020, memory 1030 (including code 1035), processor 1040 and/or bus 1045.

At 1420, the method may include outputting, from the upper layer of the UE based on the notification, an alert indicating that the paging response is delayed for a time period or until channel conditions at the UE satisfy a threshold. The operations of block 1420 may be performed in accordance with examples as disclosed herein. In some examples, aspects of the operations of 1420 may be performed by an alert component 965 as described with reference to FIG. 9. Additionally, or alternatively, means for performing 1420 may, but not necessarily, include, for example, antenna 1025, transceiver 1015, communications manager 1020, memory 1030 (including code 1035), processor 1040 and/or bus 1045.

At 1425, the method may include initiating a paging response timer based on the first signal indicating the delay, where the paging response timer is associated with a pending paging response and with a reset of one or more operation parameters of the UE. The operations of block 1425 may be performed in accordance with examples as disclosed herein. In some examples, aspects of the operations of 1425 may be performed by a paging response timer component 935 as described with reference to FIG. 9. Additionally, or alternatively, means for performing 1425 may, but not necessarily, include, for example, antenna 1025, transceiver 1015, communications manager 1020, memory 1030 (including code 1035), processor 1040 and/or bus 1045.

At 1430, the method may include transition, after the delay, to a state associated with initiation of the paging response based on satisfaction of one or more paging response conditions, where the state associated with initiation of the paging response is a state in which further service requests are ignored or buffered. The operations of block 1430 may be performed in accordance with examples as disclosed herein. In some examples, aspects of the operations of 1430 may be performed by a transition state component 940 as described with reference to FIG. 9. Additionally, or alternatively, means for performing 1430 may, but not necessarily, include, for example, antenna 1025, transceiver 1015, communications manager 1020, memory 1030 (including code 1035), processor 1040 and/or bus 1045.

At 1435, the method may include responding to a paging request after transitioning to the state associated with initiation of the paging response. The operations of block 1435 may be performed in accordance with examples as disclosed herein. In some examples, aspects of the operations of 1435 may be performed by a paging response component 945 as described with reference to FIG. 9. Additionally, or alternatively, means for performing 1435 may, but not necessarily, include, for example, antenna 1025, transceiver 1015, communications manager 1020, memory 1030 (including code 1035), processor 1040 and/or bus 1045.

The following provides an overview of aspects of the present disclosure:

Aspect 1: A method for wireless communications at a UE, comprising: receiving, at a first layer of the UE, an indication of a paging request; receiving, at the first layer of the UE and from a second layer of the UE, a first signal indicating a delay associated with a paging response to the paging request for the UE; initiating a paging response timer based at least in part on the first signal indicating the delay, wherein the paging response timer is associated with a pending paging response and with a reset of one or more operation parameters of the UE; transition, after the delay, to a state associated with initiation of the paging response based at least in part on satisfaction of one or more paging response conditions, wherein the state associated with initiation of the paging response comprises a state in which further service requests are ignored or buffered; and responding to a paging request after transitioning to the state associated with initiation of the paging response.

Aspect 2: The method of aspect 1, further comprising: operating in a first state associated with the paging response timer and associated with a pending paging response, wherein the state associated with initiation of the paging response comprises a second state.

Aspect 3: The method of aspect 2, further comprising: receiving the paging request; operating in the second state based at least in part on receipt of the paging request; monitoring, at the first layer of the UE, for the first signal while operating in the second state; and transitioning from the second state to the first state based at least in part on the first signal indicating the delay, wherein initiating the paging response timer is based at least in part on transitioning to the first state.

Aspect 4: The method of any of aspects 2 through 3, further comprising: receiving a signal indicating an activation of a delayed paging response procedure for the UE, wherein operation in the first state is further based at least in part on the activation of the delayed paging response procedure.

Aspect 5: The method of any of aspects 1 through 4, wherein the first signal is based at least in part on a failure of a random-access procedure by the UE, a failure of a signal coverage level for the UE to satisfy a threshold signal coverage level, or both.

Aspect 6: The method of any of aspects 1 through 5, wherein receiving the first signal at the first layer of the UE comprises: receiving, at the first layer of the UE and from the second layer of the UE, a pre-paging signal, wherein the pre-paging signal indicates the paging request and the delay associated with the paging response.

Aspect 7: The method of any of aspects 1 through 6, wherein the satisfaction of the one or more paging response conditions comprises an expiration of the paging response timer, the paging response timer associated with a first state.

Aspect 8: The method of any of aspects 1 through 7, further comprising: receiving, at the first layer of the UE and from the second layer of the UE, a second signal that indicates the satisfaction of the one or more paging response conditions, wherein the one or more paging response conditions comprise a coverage level of the UE satisfying a threshold coverage level, an expiration of the paging response timer, or both, and wherein the UE transitions to the state associated with the initiation of the paging response based at least in part on the second signal.

Aspect 9: The method of any of aspects 1 through 8, further comprising: receiving, at the first layer of the UE and from an upper layer of the UE, a third signal that indicates the paging request, wherein the satisfaction of the one or more paging response conditions is based at least in part on the third signal.

Aspect 10: The method of aspect 9, further comprising: receiving, at the first layer of the UE and from the second layer of the UE, a second signal that indicates that a signal coverage level of the UE satisfies a threshold signal coverage level; and forwarding, from the first layer of the UE and to the upper layer of the UE, the second signal, wherein the third signal from the upper layer is based at least in part on the second signal.

Aspect 11: The method of any of aspects 1 through 10, further comprising: transmitting, from the first layer of the UE and to an upper layer of the UE, a notification that indicates receipt of the first signal at the first layer of the UE; and outputting, from the upper layer of the UE based at least in part on the notification, an alert indicating that the paging response is delayed for a time period or until channel conditions at the UE satisfy a threshold.

Aspect 12: The method of any of aspects 1 through 11, further comprising: transmitting a registration request, a serving request, or both based at least in part on the transition to the state associated with the initiation of the paging response.

Aspect 13: The method of any of aspects 1 through 12, further comprising: establishing, before receipt of the first signal, a connection between the UE and a network, wherein, based at least in part on establishment of the connection between the UE and the network, the one or more operation parameters of the UE that are reset in accordance with the paging response timer comprise one or more serving request states, one or more timers, or any combination thereof.

Aspect 14: The method of any of aspects 1 through 13, further comprising: initiating a registration attempt with a network, wherein the first signal is received before completion of the registration attempt, and wherein, based at least in part on receipt of the first signal before the completion of the registration attempt, the one or more operation parameters of the UE that are reset in accordance with the paging response timer comprise a registration request, one or more timers, or any combination thereof.

Aspect 15: The method of any of aspects 1 through 14, wherein the first layer of the UE comprises a non-access stratum layer and the second layer of the UE comprises a radio resource control layer.

Aspect 16: A UE for wireless communications, comprising one or more memories storing processor-executable code, and one or more processors coupled with the one or more memories and individually or collectively operable to execute the code to cause the UE to perform a method of any of aspects 1 through 15.

Aspect 17: A UE for wireless communications, comprising at least one means for performing a method of any of aspects 1 through 15.

Aspect 18: A non-transitory computer-readable medium storing code for wireless communications, the code comprising instructions executable by one or more processors to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive, at a first layer of the UE, an indication of a paging request;

receive, at the first layer of the UE and from a second layer of the UE after the paging request, a first signal indicating a delay associated with a paging response to the paging request for the UE;

initiate a paging response timer based at least in part on the first signal indicating the delay, wherein the paging response timer is associated with a pending paging response and with a reset of one or more operation parameters of the UE;

transition, after the delay, to a state associated with initiation of the paging response based at least in part on satisfaction of one or more paging response conditions, wherein the state associated with initiation of the paging response comprises a state in which further service requests are ignored or buffered; and respond to the paging request after transitioning to the state associated with initiation of the paging response.

2. The UE of claim 1, wherein the one or more processors are individually or collectively further operable to execute the code to cause the UE to:

operate in a first state associated with the paging response timer and associated with the pending paging response, wherein the state associated with initiation of the paging response comprises a second state.

3. The UE of claim 2, wherein the one or more processors are individually or collectively further operable to execute the code to cause the UE to:

receive the paging request;

operate in the second state based at least in part on receipt of the paging request;

monitor, at the first layer of the UE, for the first signal while operating in the second state; and transition from the second state to the first state based at least in part on the first signal indicating the delay, wherein the one or more processors are individually or collectively operable to execute the code to cause the UE to initiate the paging response timer based at least in part on transitioning to the first state.

4. The UE of claim 2, wherein the one or more processors are individually or collectively further operable to execute the code to cause the UE to:

receive a signal indicating an activation of a delayed paging response procedure for the UE, wherein operation in the first state is further based at least in part on the activation of the delayed paging response procedure.

5. The UE of claim 1, wherein the first signal is based at least in part on a failure of a random-access procedure by the UE, a failure of a signal coverage level for the UE to satisfy a threshold signal coverage level, or both.

6. The UE of claim 1, wherein, to receive the first signal at the first layer of the UE, the one or more processors are individually or collectively operable to execute the code to cause the UE to:

receive, at the first layer of the UE and from the second layer of the UE, a pre-paging signal, wherein the pre-paging signal indicates the paging request and the delay associated with the paging response.

7. The UE of claim 1, wherein the satisfaction of the one or more paging response conditions comprises an expiration of the paging response timer, the paging response timer associated with a first state.

8. The UE of claim 1, wherein the one or more processors are individually or collectively further operable to execute the code to cause the UE to:

receive, at the first layer of the UE and from the second layer of the UE, a second signal that indicates the satisfaction of the one or more paging response conditions, wherein the one or more paging response conditions comprise a coverage level of the UE satisfying a threshold coverage level, an expiration of the paging response timer, or both, and wherein the one or more processors are individually or collectively operable to execute the code to cause the UE to transition to the state associated with the initiation of the paging response based at least in part on the second signal.

9. The UE of claim 1, wherein the one or more processors are individually or collectively further operable to execute the code to cause the UE to:

receive, at the first layer of the UE and from an upper layer of the UE, a third signal that indicates the paging request, wherein the satisfaction of the one or more paging response conditions is based at least in part on the third signal.

10. The UE of claim 9, wherein the one or more processors are individually or collectively further operable to execute the code to cause the UE to:

receive, at the first layer of the UE and from the second layer of the UE, a second signal that indicates that a signal coverage level of the UE satisfies a threshold signal coverage level; and forward, from the first layer of the UE and to the upper layer of the UE, the second signal, wherein the third signal from the upper layer be based at least in part on the second signal.

11. The UE of claim 1, wherein the one or more processors are individually or collectively further operable to execute the code to cause the UE to:

transmit, from the first layer of the UE and to an upper layer of the UE, a notification that indicates receipt of the first signal at the first layer of the UE; and output, from the upper layer of the UE based at least in part on the notification, an alert indicating that the paging response is delayed for a time period or until channel conditions at the UE satisfy a threshold.

12. The UE of claim 1, wherein the one or more processors are individually or collectively further operable to execute the code to cause the UE to:

transmit a registration request, a serving request, or both based at least in part on the transition to the state associated with the initiation of the paging response.

13. The UE of claim 1, wherein the one or more processors are individually or collectively further operable to execute the code to cause the UE to:

establish, before receipt of the first signal, a connection between the UE and a network, wherein, based at least in part on establishment of the connection between the UE and the network, the one or more operation parameters of the UE that are reset in accordance with the paging response timer comprise one or more serving request states, one or more timers, or any combination thereof.

14. The UE of claim 1, wherein the one or more processors are individually or collectively further operable to execute the code to cause the UE to:

initiate a registration attempt with a network, wherein the first signal is received before completion of the registration attempt, and wherein, based at least in part on receipt of the first signal before the completion of the registration attempt, the one or more operation parameters of the UE that the one or more processors are individually or collectively operable to execute the code to cause the UE to reset in accordance with the paging response timer comprise a registration request, one or more timers, or any combination thereof.

15. The UE of claim 1, wherein the first layer of the UE comprises a non-access stratum layer and the second layer of the UE comprises a radio resource control layer.

16. A method for wireless communications at a user equipment (UE), comprising:

receiving, at a first layer of the UE, an indication of a paging request;

receiving, at the first layer of the UE and from a second layer of the UE after the paging request, a first signal indicating a delay associated with a paging response to the paging request for the UE;

initiating a paging response timer based at least in part on the first signal indicating the delay, wherein the paging response timer is associated with a pending paging response and with a reset of one or more operation parameters of the UE;

transitioning, after the delay, to a state associated with initiation of the paging response based at least in part on satisfaction of one or more paging response conditions, wherein the state associated with initiation of the paging response comprises a state in which further service requests are ignored or buffered; and responding to the paging request after transitioning to the state associated with initiation of the paging response.

17. The method of claim 16, further comprising:

operating in a first state associated with the paging response timer and associated with the pending paging response, wherein the state associated with initiation of the paging response comprises a second state.

18. The method of claim 17, further comprising:

receiving the paging request;

operating in the second state based at least in part on receipt of the paging request;

monitoring, at the first layer of the UE, for the first signal while operating in the second state; and transitioning from the second state to the first state based at least in part on the first signal indicating the delay, wherein initiating the paging response timer is based at least in part on transitioning to the first state.

19. The method of claim 16, wherein the first signal is based at least in part on a failure of a random-access procedure by the UE, a failure of a signal coverage level for the UE to satisfy a threshold signal coverage level, or both.

20. The method of claim 16, wherein receiving the first signal at the first layer of the UE comprises:

receiving, at the first layer of the UE and from the second layer of the UE, a pre-paging signal, wherein the pre-paging signal indicates the paging request and the delay associated with the paging response.

21. The method of claim 16, wherein the satisfaction of the one or more paging response conditions comprises an expiration of the paging response timer, the paging response timer associated with a first state.

22. The method of claim 16, further comprising:

receiving, at the first layer of the UE and from the second layer of the UE, a second signal that indicates the satisfaction of the one or more paging response conditions, wherein the one or more paging response conditions comprise a coverage level of the UE satisfying a threshold coverage level, an expiration of the paging response timer, or both, and wherein the UE transitions to the state associated with the initiation of the paging response based at least in part on the second signal.

23. The method of claim 16, further comprising:

receiving, at the first layer of the UE and from an upper layer of the UE, a third signal that indicates the paging request, wherein the satisfaction of the one or more paging response conditions is based at least in part on the third signal.

24. The method of claim 16, further comprising:

transmitting, from the first layer of the UE and to an upper layer of the UE, a notification that indicates receipt of the first signal at the first layer of the UE; and outputting, from the upper layer of the UE based at least in part on the notification, an alert indicating that the paging response is delayed for a time period or until channel conditions at the UE satisfy a threshold.

25. The method of claim 16, further comprising:

transmitting a registration request, a serving request, or both based at least in part on the transition to the state associated with the initiation of the paging response.

26. The method of claim 16, further comprising:

establishing, before receipt of the first signal, a connection between the UE and a network, wherein, based at least in part on establishment of the connection between the UE and the network, the one or more operation parameters of the UE that are reset in accordance with the paging response timer comprise one or more serving request states, one or more timers, or any combination thereof.

27. A user equipment (UE) for wireless communications, comprising:

means for receiving, at a first layer of the UE, an indication of a paging request;

means for receiving, at the first layer of the UE and from a second layer of the UE after the paging request, a first signal indicating a delay associated with a paging response to the paging request for the UE;

means for initiating a paging response timer based at least in part on the first signal indicating the delay, wherein the paging response timer is associated with a pending paging response and with a reset of one or more operation parameters of the UE;

means for transitioning, after the delay, to a state associated with initiation of the paging response based at least in part on satisfaction of one or more paging response conditions, wherein the state associated with initiation of the paging response comprises a state in which further service requests are ignored or buffered; and means for responding to the paging request after transitioning to the state associated with initiation of the paging response.

28. The UE of claim 27, further comprising:

means for operating in a first state associated with the paging response timer and associated with the pending paging response, wherein the state associated with initiation of the paging response comprises a second state.

29. A non-transitory computer-readable medium storing code for wireless communications, the code comprising instructions executable by one or more processors to:

receive, at a first layer of a user equipment (UE), an indication of a paging request;

receive, at the first layer of the UE and from a second layer of the UE after the paging request, a first signal indicating a delay associated with a paging response to the paging request for the UE;

initiate a paging response timer based at least in part on the first signal indicating the delay, wherein the paging response timer is associated with a pending paging response and with a reset of one or more operation parameters of the UE;

transition, after the delay, to a state associated with initiation of the paging response based at least in part on satisfaction of one or more paging response conditions, wherein the state associated with initiation of the paging response comprises a state in which further service requests are ignored or buffered; and respond to the paging request after transitioning to the state associated with initiation of the paging response.

30. The non-transitory computer-readable medium of claim 29, wherein the instructions are further executable by the one or more processors to:

operate in a first state associated with the paging response timer and associated with the pending paging response, wherein the state associated with initiation of the paging response comprises a second state.

* * * * *